(12) United States Patent
Choi et al.

(10) Patent No.: US 10,306,313 B2
(45) Date of Patent: *May 28, 2019

(54) DISPLAY APPARATUS AND METHOD FOR CONTROLLING A SCREEN OF DISPLAY APPARATUS

(71) Applicant: SAMSUNG ELECTRONICS CO., LTD., Suwon-si (KR)

(72) Inventors: Eun-seok Choi, Suwon-si (KR); Byung-seok Soh, Yongin-si (KR); Mi-ra Yu, Seoul (KR); Yong-wan Choi, Seongnam-si (KR); Sang-on Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/171,139

(22) Filed: Jun. 2, 2016

(65) Prior Publication Data

US 2017/0026700 A1 Jan. 26, 2017

(30) Foreign Application Priority Data

Jul. 24, 2015 (KR) ........................ 10-2015-0105202

(51) Int. Cl.
*H04N 21/443* (2011.01)
*H04N 21/422* (2011.01)
(Continued)

(52) U.S. Cl.
CPC ....... *H04N 21/4432* (2013.01); *A63F 13/213* (2014.09); *A63F 13/27* (2014.09);
(Continued)

(58) Field of Classification Search
CPC .................................................. H04N 21/4432
See application file for complete search history.

(56) References Cited

U.S. PATENT DOCUMENTS 8,804,039 B2 8/2014 Kim et al.
9,041,862 B2 5/2015 Kim et al.
(Continued)

FOREIGN PATENT DOCUMENTS

EP 2 447 833 A1 5/2012
JP 2007-124210 A 5/2007
(Continued)

OTHER PUBLICATIONS

Written Opinion dated Nov. 14, 2016 issued by International Searching Authority in counterpart International Application No. PCT/KR2016/008013.

(Continued)

*Primary Examiner* — Junior O Mendoza
(74) *Attorney, Agent, or Firm* — Sughrue Mion, PLLC

(57) ABSTRACT

A display apparatus and a method for controlling a display apparatus are provided. The display apparatus includes a detector configured to detect a user motion; a display; a power supplier; a communicator configured to receive control information from a remote control device; and a controller configured to control the detector, the display, the power supplier, and the communicator, to control the display to display a preset screen on a part of the display in response to a user motion detected by the detector and first control information received from the remote control device, and to control the display to display content in response to second control information received from the remote control device.

15 Claims, 13 Drawing Sheets

(51) Int. Cl.
*H04N 21/442* (2011.01)
*H04N 5/63* (2006.01)
*A63F 13/213* (2014.01)
*A63F 13/42* (2014.01)
*A63F 13/27* (2014.01)
*H04N 5/44* (2011.01)

(52) U.S. Cl.
CPC ........... *A63F 13/42* (2014.09); *H04N 5/4403* (2013.01); *H04N 5/63* (2013.01); *H04N 21/42201* (2013.01); *H04N 21/42204* (2013.01); *H04N 21/44213* (2013.01); *H04N 21/44218* (2013.01); *H04N 21/42222* (2013.01); *H04N 2005/4428* (2013.01)

(56) References Cited

U.S. PATENT DOCUMENTS

| | | | |
|---|---|---|---|
| 2006/0109384 A1 | 5/2006 | Miller-Smith et al. | |
| 2007/0139569 A1 | 6/2007 | Matsubayashi | |
| 2007/0159558 A1 | 7/2007 | Su et al. | |
| 2008/0052740 A1* | 2/2008 | Sakai | H04N 5/4401 725/32 |
| 2010/0235667 A1* | 9/2010 | Mucignat | G06F 1/3203 713/323 |
| 2011/0181574 A1* | 7/2011 | Champion | H04N 9/3155 345/211 |
| 2012/0086857 A1 | 4/2012 | Kim et al. | |
| 2012/0154303 A1* | 6/2012 | Lazaridis | G06F 1/3203 345/173 |
| 2012/0159330 A1 | 6/2012 | Jeong et al. | |
| 2012/0278603 A1* | 11/2012 | Lee | G06F 9/4418 713/2 |
| 2014/0075226 A1* | 3/2014 | Heo | G06F 1/3234 713/323 |
| 2014/0325560 A1 | 10/2014 | Kim et al. | |
| 2015/0015380 A1* | 1/2015 | Choi | G08C 17/02 340/12.22 |
| 2015/0085060 A1* | 3/2015 | Fish | G06F 1/266 348/14.03 |
| 2015/0109535 A1* | 4/2015 | Huang | H04N 21/4432 348/730 |
| 2015/0172585 A1* | 6/2015 | Park | H04N 5/4403 348/730 |
| 2015/0172586 A1 | 6/2015 | Jung | |
| 2015/0229870 A1 | 8/2015 | Kim et al. | |
| 2016/0343345 A1* | 11/2016 | Moon | G08C 17/02 |

FOREIGN PATENT DOCUMENTS

| | | |
|---|---|---|
| JP | 2007-158621 A | 6/2007 |
| JP | 2007-300251 A | 11/2007 |
| KR | 10-2005-0091948 A | 9/2005 |
| KR | 10-2011-0013001 A | 2/2011 |
| KR | 10-2012-0052572 A | 5/2012 |
| KR | 10-2012-0100097 A | 9/2012 |
| KR | 10-2012-0122183 A | 11/2012 |
| KR | 10-2013-0138543 A | 12/2013 |
| KR | 10-2014-0032782 A | 3/2014 |
| KR | 10-2015-0007954 A | 1/2015 |
| WO | 2014/119812 A1 | 8/2014 |

OTHER PUBLICATIONS

International Search Report dated Nov. 14, 2016 issued by International Searching Authority in counterpart International Application No. PCT/KR2016/008013.
Communication dated Feb. 28, 2018 by the European Patent Office on counterpart European Patent Application No. 16830766.8.
Communication dated Mar. 22, 2019, issued by the European Patent Office in counterpart European Application No. 16 830 766.8.

\* cited by examiner

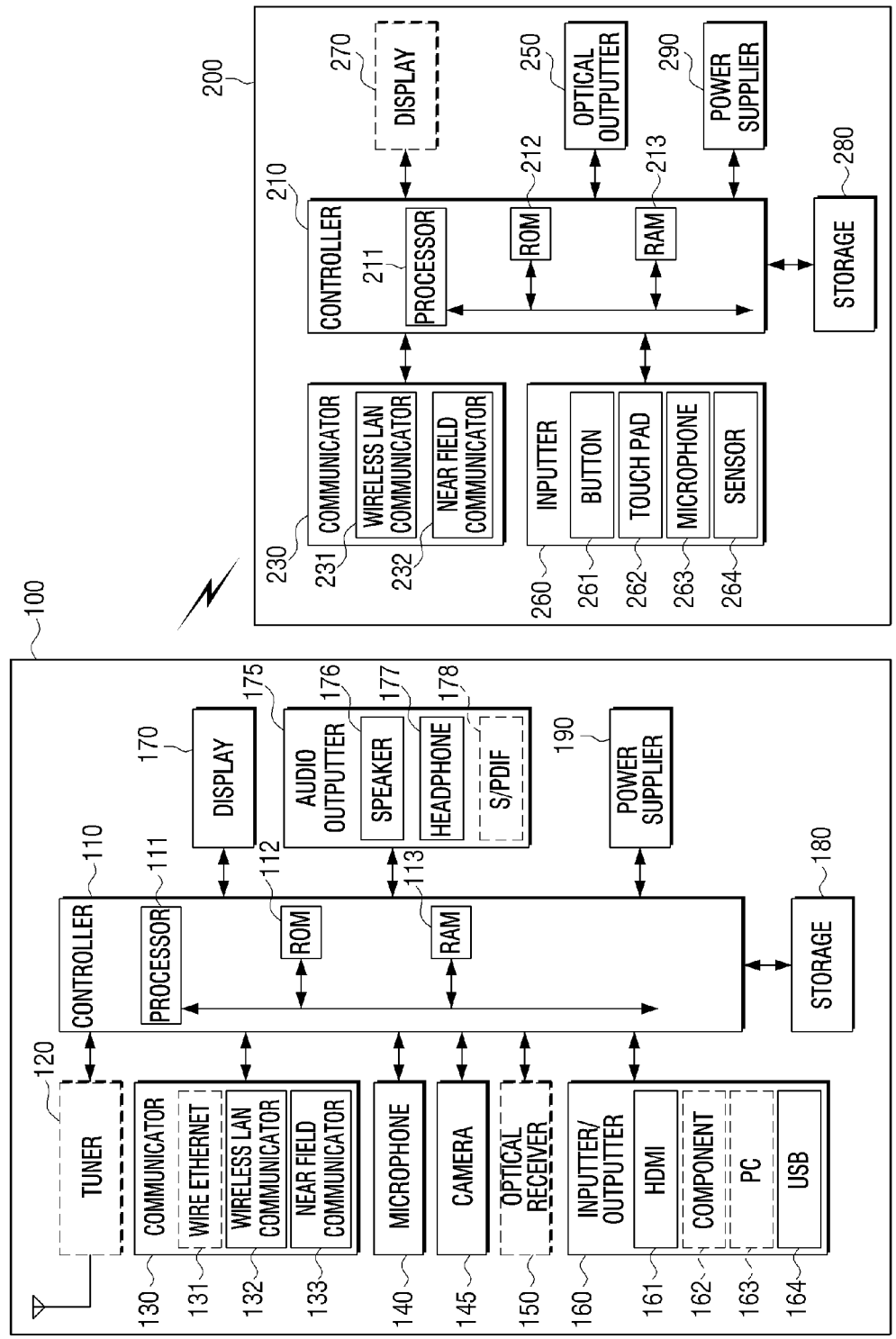

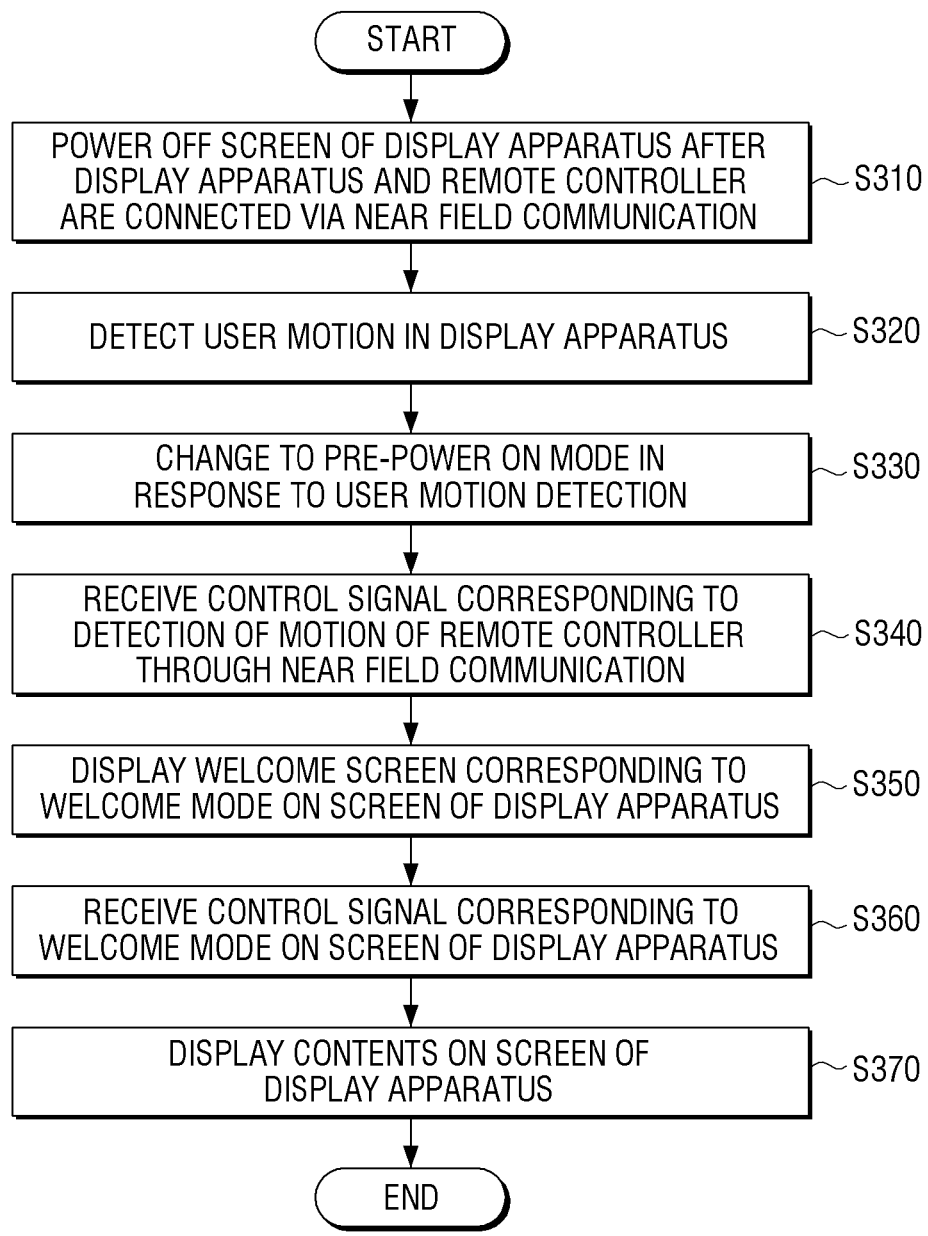

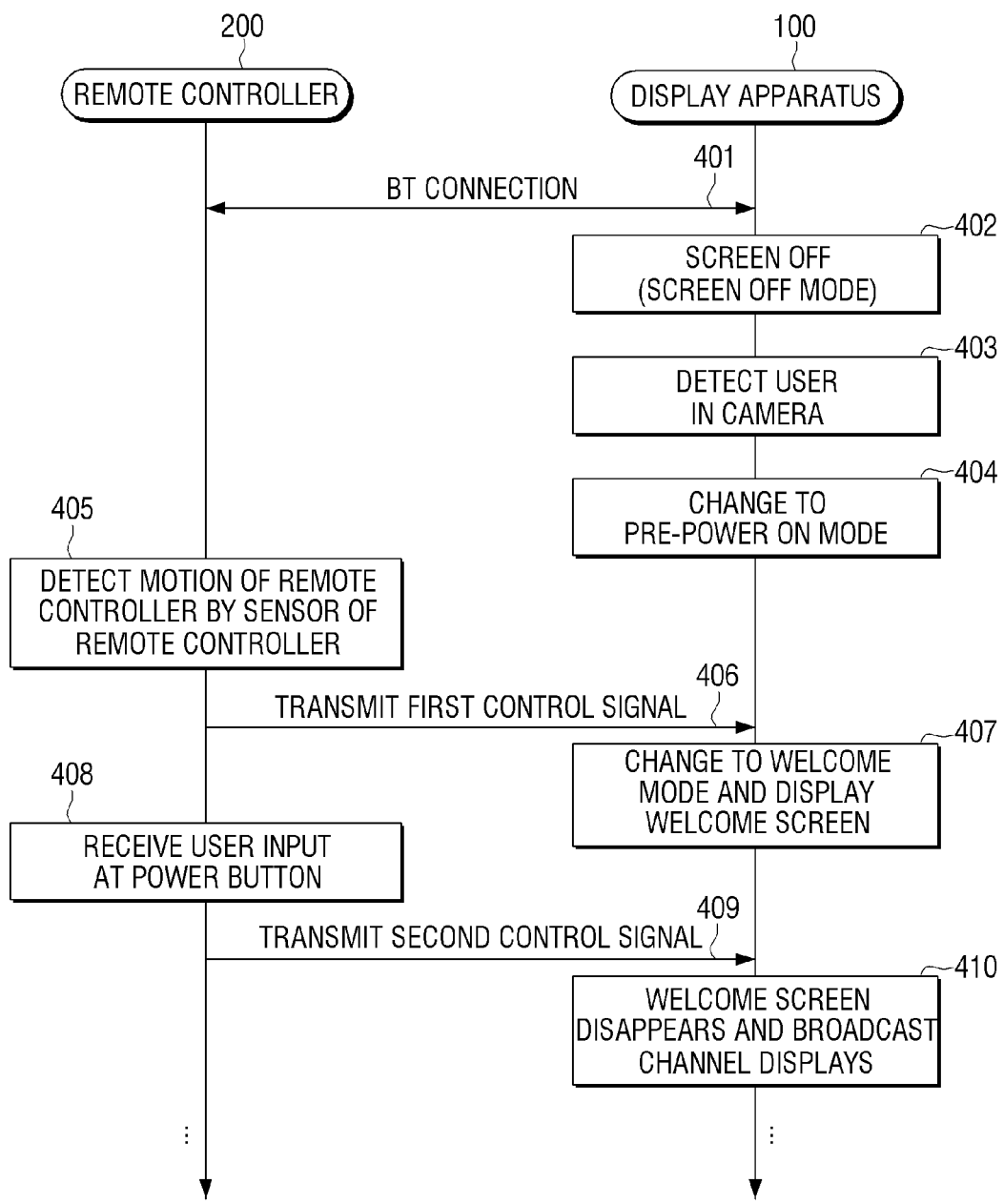

DISPLAY APPARATUS AND METHOD FOR CONTROLLING A SCREEN OF DISPLAY APPARATUS

CROSS-REFERENCE TO RELATED APPLICATION(S)

This application claims priority from Korean Patent Application No. 10-2015-0105202, filed in the Korean Intellectual Property Office on Jul. 24, 2015, the disclosure of which is incorporated herein by reference.

BACKGROUND

1. Field

Apparatuses and methods consistent with exemplary embodiments relate to a display apparatus and a method of controlling a screen of the display apparatus, more particularly to, a display apparatus using an embedded camera and a remote controller and a method of controlling a screen of the display apparatus.

2. Description of the Related Art

As an interface between a display apparatus and a user, a panel key of the display apparatus or a remote controller is widely used. By the development of the art, functions of a display apparatus have become complex (for example, executing various applications and games, etc.) and diverse, and thus executing contents downloaded from outside, such as a video or internet browsing, is available.

As a result of complicated and various functions of a display apparatus, a booting time of a display apparatus increases. Separate from a high-performance display apparatus, there is necessity to shorten a booting time of a display apparatus.

SUMMARY

One or more exemplary embodiments provide a display apparatus which is capable of controlling a screen of a display apparatus by using a user detector, a sensor of a remote controller, and a power button and a method for controlling a screen of the display apparatus.

One or more exemplary embodiments also provide a display apparatus which can shorten a booting time of a display apparatus by using the user detector and the sensor of the remote controller and a method for controlling a screen of the display apparatus.

One or more exemplary embodiments also provide a display apparatus which can shorten a booting time of a display apparatus by using a user detector, a sensor of a remote controller, and a power button and a method for controlling a screen of the display apparatus.

One or more exemplary embodiments also provide a display apparatus which is capable of saving consumption power that corresponds to a booting of the display apparatus by using a user detector and a remote controller and a method for controlling a screen.

One or more exemplary embodiments also provide a display apparatus which is capable of saving consumption power that corresponds to a booting of the display apparatus by using a user detector, a sensor of a remote controller, and a power button and a method for controlling a screen.

According to an aspect of an exemplary embodiment, there is provided a display apparatus including: a detector configured to detect a user motion; a display; a power supplier; a communicator configured to receive control information from a remote control device; and a controller configured to control the detector, the display, the power supplier, and the communicator, wherein the controller controls to display a preset screen on a part of the display in response to a user motion detected by the detector and first control information received from the remote control device, and display a content on the display in response to second control information received from the remote control device.

According to an aspect of an exemplary embodiment, there is provided a display apparatus including: a detector configured to detect a user motion; a display; a power supplier; a communicator configured to receive control information from a remote control device; and a controller configured to control the detector, the display, the power supplier, and the communicator, wherein the controller controls to display a preset screen on a portion of the display in response to a user motion detected by the detector and first control information received from the remote control device, and display content on a whole of the display in response to second control information received from the remote control device.

According to an aspect of another exemplary embodiment, there is provided a method for controlling a screen of a display apparatus, the method including: shifting a state of the display apparatus from a power off mode to a pre-power on mode in response to a user motion that is detected; shifting the state of the display apparatus from the pre-power on mode to a welcome mode in response to a first control signal received from a remote control device; displaying a preset screen on the display apparatus; and displaying a content on the display apparatus instead of the preset screen in response to a second control signal received from the remote control device.

According to an aspect of another exemplary embodiment, there is provided the method for controlling a screen of the display apparatus may include that when the display apparatus is in the pre-power on mode, no power is supplied to the screen.

According to an aspect of another exemplary embodiment, there is provided a remote control device including: a sensor configured to detect a motion of the remote control device; a power button configured to be selected to turn on power to a display apparatus; a communicator configured to communicate with the display apparatus; and, a controller configured to control the sensor and the communicator, wherein the controller controls to transmit first control information that corresponds to the motion detected by the sensor and second control information that corresponds to a selection of the power button via the communicator.

BRIEF DESCRIPTION OF THE DRAWINGS

The above and/or other aspects will be more apparent by describing in detail exemplary embodiments, with reference to the accompanying drawings, in which:

FIG. 2 is a block diagram illustrating a display apparatus and a remote controller, according to an exemplary embodiment;

FIG. 3 is a flowchart illustrating a method for controlling a screen, according to an exemplary embodiment;

FIG. 4 is a sequence diagram illustrating a method for controlling a screen of a display apparatus, according to an exemplary embodiment;

DETAILED DESCRIPTION

Figure 1:
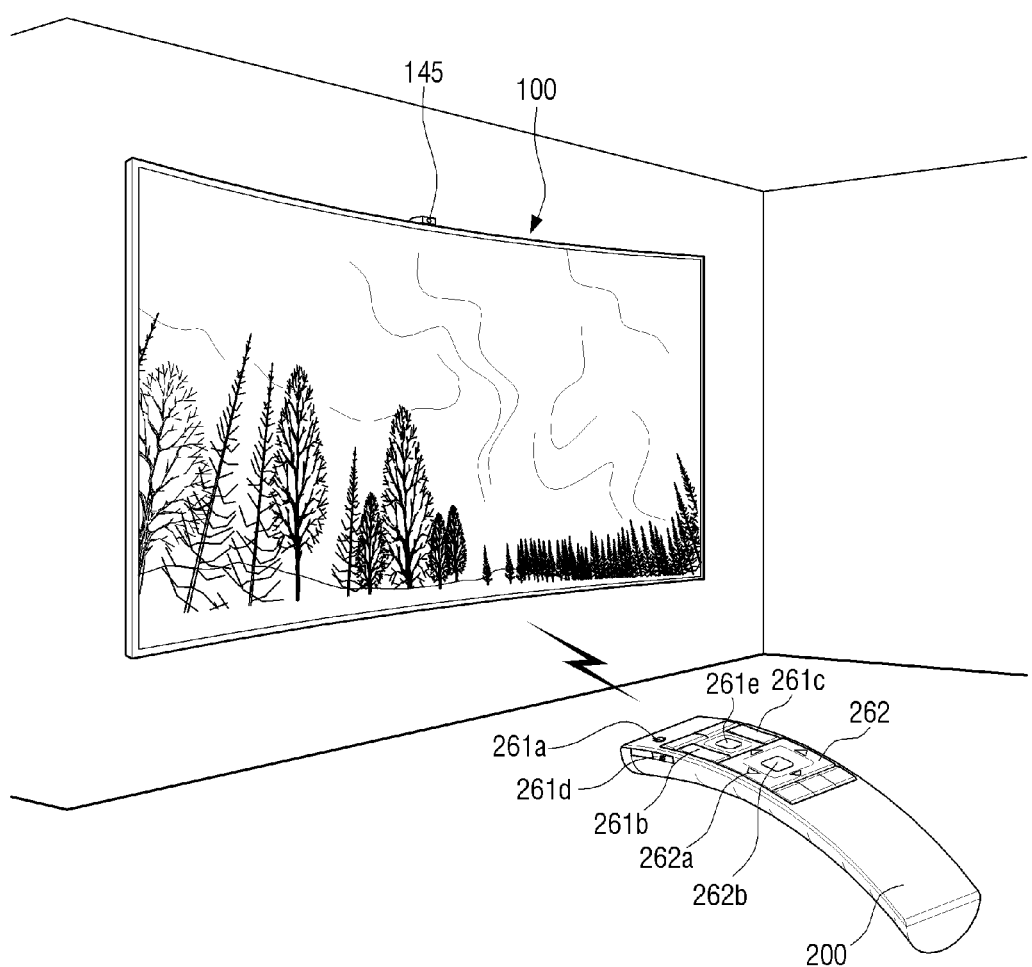
FIG. 1 illustrates an operation between a display apparatus and a remote controller, according to an exemplary embodiment.

In the following description, same drawing reference numerals are used for the same elements even in different drawings. The matters defined in the description, such as detailed construction and elements, are provided to assist in a comprehensive understanding of the exemplary embodiments. Further, the same reference numerals or signs respectively described in the drawings attached to the present specification indicate parts or elements that perform the actually same functions.

In addition, the terms "first", "second", etc. may be used to describe diverse components, but the components are not limited by the terms. The terms are only used to distinguish one component from the others. For example, used orders, arrangement orders, or the like of elements that are combined with these ordinal numbers may not be limited by the numbers. If necessary, the ordinal numbers may be respectively replaced and used.

In the exemplary embodiments, "selecting a button (or a key)" in the remote controller (200, FIG. 1) may be used as a term that indicates a pressing of a button (or a key) or a touch of a button (or a key). In addition, "user input", for example, can be used as a term which includes a selection of a button (or key) by a user, a button (or key) press by a user, a button touch by a user, a touch gesture of a user, a user voice, and/or a user motion.

In the exemplary embodiment, a "touch (including a touch gesture) at the remote controller 200" can be input by a body of a user or an input pen (for example, a stylus (not shown)) manipulated by the user.

In an exemplary embodiment, a "screen of a display apparatus" can be used as a meaning to include a display of the display apparatus. In addition, a camera which detects a user motion and/or various sensors can be called a user motion detector. A camera may include an image sensor (not shown).

In the exemplary embodiment, "screen off of a display apparatus" can be used as the same meaning as a power-off state of the display apparatus. In the screen off of the display apparatus, a plug of a power cable of the display apparatus is connected to a power consent.

The singular expression also includes the plural meaning as long as it does not create a contradiction in the context. In the present application, the terms "include" and "comprise" designate the presence of features, numbers, steps, operations, components, elements, or a combination thereof that are written in the specification, but do not exclude the presence or possibility of addition of one or more other features, numbers, steps, operations, components, elements, or a combination thereof.

The same reference numbers illustrated in each drawing indicate members which perform substantially the same functions.

FIG. 1 is a drawing illustrating an operation between a remote controller and a display apparatus, according to an exemplary embodiment.

Referring to FIG. 1, a display apparatus 100 and a remote controller (also referred to herein as a "remote control device") 200 are displayed.

The display apparatus 100 may detect a user's motion via the use of a camera 145. The display apparatus 100 of which a screen is off may detect a user motion by using a camera 145.

The display apparatus 100, when a user motion is detected, even before a user directly controls the remote controller 200 by holding it, may be in a pre-power on state in advance.

A remote controller 200 may transmit a control command through infrared or near field communication (for example, Bluetooth) in order to control the display apparatus 100.

A user may control (for example, by performing any one or more of power on/off, booting, channel change, volume control, or content reproduction operations) the display apparatus 100 by using a selection of a key (including a button) on the remote controller 200 and by providing a user input (for example, any one or more or voice recognition through a touchpad, microphone, motion recognition through a sensor). In addition, a user may control (for example, by using any one or more of voice recognition through a touchpad, microphone, motion recognition through a sensor) the display apparatus 100 through a motion recognition by using a camera 145 attached to the display apparatus.

A user, by performing a motion (such as, for example, a gripping or moving) of the remote controller 200, may control a screen of the display apparatus 100. A user may control to operate a power off display apparatus 100 (for example, turn off a part of a screen) by gripping or moving the remote controller 200. In addition, a user may control to operate a power off display apparatus 100 (for example, turn on a part of a screen) by gripping or moving the remote controller 200.

In response to a motion of the remote controller 200, the display apparatus 100 may turn on a power supply to a screen. In response to a motion of the remote controller 200, the display apparatus 100 may turn on a power supply to a part of a screen. In response to a motion of the remote controller 200, power can be supplied to a part of a screen of the display apparatus 100.

Items of information that relate to a display apparatus, for example, may include an output resolution (for example, high definition (HD), full HD, ultra HD or greater resolution) of the display apparatus 100, whether a screen is curved or flat, a display type (such as, for example, any of LCD (liquid crystal display), OLED (Organic Light Emitting Diodes), AMOLED (active matrix organic light-emitting diode), PDP (Plasma Display Panel), or QD (Quantum Dot)), a length of diagonal of a screen (for example, 66 cm, 80 cm, 101 cm, 152 cm, 189 cm, 200 cm or more), a width/length of the display apparatus 100 (for example, 643.4 mm×396.5 mm, 934.0 mm×548.6 mm, 1,670.2 mm×962.7 mm, 2,004.3 mm×1,635.9 mm), and/or a width/length ratio (also referred to herein as an "aspect ratio") of the display apparatus 100 (for example, 4:3, 16:9, 16:10, 21:9 or 21:10) can be included.

The display apparatus information may indicate information that corresponds to a specification or a manual disclosed in a web page of the display apparatus 100.

Referring also to FIG. 2, the display apparatus information can be stored in a storage 180 of the display apparatus 100. In addition, display apparatus information can be downloaded via the communicator 130 from outside of the display apparatus 100 through control of the controller 110 of the display apparatus 100.

Items included in the display apparatus information that can be changed in response to functions or structure of the display apparatus 100 may be easily understood by those of ordinary skill in the art.

Referring to FIG. 1 and FIG. 2, the remote controller 200 includes a key or a button 261 which corresponds to functions and/or operations of the display apparatus 100. A key 261 may include a physical button or a touch button. In addition, the remote controller 200 may include a single function key (for example, 261a, 261b, 261c, 261d, 261e) that corresponds to the functions of the display apparatus 100 and/or a multi function key (not shown).

A single function key (for example, a power button 261a, pointer 261e of the remote controller 200 can be used as a term indicating a key which corresponds to control of one function from among a plurality of functions executed by the display apparatus 100. Most of the keys in the remote controller 200 may be a single function key.

A multi function key (for example, a color key (not shown) of the remote controller 200 can be used as a term indicating a key which corresponds to control of subordinate functions which are variably provided (or set) according to functions executed by the display apparatus 100. A color key (not shown) may include a red key (not shown), a green key (not shown), a yellow key (not shown), and a blue key (not shown). An arrangement order of a color key (not shown) can be varied, and the number of the color key (not shown) can be added, changed, or deleted in response to a function of the display apparatus 100.

FIG. 2 is a block diagram illustrating a display apparatus and a remote controller, according to an exemplary embodiment.

Referring to FIG. 2, the display apparatus 100 which receives control information from the remote controller 200 can be connected to an external e-device (not shown) with or without a wire by the communicator 130 or inputter/outputter 160. The external e-device may include a mobile phone (not shown), smartphone (not shown), a tablet PC (not shown), a PC (not shown), and a server (not shown).

The display apparatus 100 includes the display 170 and may further include a tuner 120, the communicator 130, and inputter/outputter 160. The display apparatus 100 includes the display 170 and may further include a combination of the tuner 120, the communicator 130, and inputter/outputter 160. In addition, the display apparatus 100 including the display 170 can be electrically connected to a separate e-device (not shown) having a tuner (not shown).

The display apparatus 100, for example, may be implemented as any of an analog TV, digital TV, 3D-TV, smart TV, LED TV, OLED TV, plasma TV, monitor, a curved TV with fixed curvature, a flexible TV with a screen which is a fixed curvature, a bended TV with a screen which is a fixed curvature, and/or a curvature changeable TV of which curvature of a current screen can be changed by a received user input, but is not limited thereto. This could be easily understood by those of ordinary skill in the art.

The display apparatus 100 includes tuner 120, the communicator 130, microphone 140, camera 145, optical receiver 150, inputter/outputter 160, the display 170, audio outputter 175, storage 180, and power supplier 190. The display apparatus 100 may include a sensor (for example, any of an illumination sensor, a temperature sensor, etc., not shown) which detects an internal state or an external state of the display apparatus 100.

The controller 110 may include a processor 111, a read-only memory (ROM) (or non-volatile memory 112) where a control program for controlling the display apparatus 100 is stored, and a random-access memory (RAM) (or volatile memory, 113) which stores a signal or data which is input from an outside of the display apparatus 100, or is used as a storage area corresponding to various operations performed by the display apparatus 100.

The controller 110 performs functions to control overall operations of the display apparatus 100, to control signal flow among internal components 120-190 of the display apparatus 100, and to process data. The controller 110 controls power provided to internal components 120-180 from the power supplier 190. In addition, when an input by a user is received or a preset and prestored condition is satisfied, the controller 110 may execute an operating system (OS) stored in the storage 180 and various applications.

The processor 111 may include a processor (such as, for example, a graphic processing unit (GPU), not shown) for graphic processing that corresponds to a video or an image. The processor 111 can be implemented as a system on chip (SoC) which includes a core (not shown) and a GPU. In addition, the processor 111 can be implemented as a SoC which includes at least one of the ROM 112 and the RAM 113. The processor 111 may include any of a single core, dual core, triple core, quad core, and core which is N times.

The processor 111 may include a plurality of processors. The plurality of processors may include a main processor (not shown) which operates in a pre-power on mode (see FIG. 7), a welcome mode (FIG. 7) and/or a normal mode (FIG. 7) which displays a broadcast screen that corresponds to one of the states of the display apparatus 100; and a sub processor (not shown) which operates in a screen off mode (FIG. 7) and/or a pre-power on mode that corresponds to one of the states of another display apparatus 100. Here, the pre-power on mode indicates a mode in which a user's motion is detected and a preparation is made for the display apparatus 100 to be activated, and a welcome mode indicates a mode to perform a corresponding operation when a user picks up the remote controller 200. The terms such as pre-power on mode and welcome mode can be substituted with different terms.

A plurality of processors (such as a main processor and a sub processor) included in the controller 110 may operate or may not operate in response to a state of the display apparatus 100. For example, a main processor (not shown) operates in a pre-power on mode, welcome mode and/or normal mode. In the pre-power on mode, welcome mode and/or normal mode, the controller 110 which includes the main processor (not shown) can also operate. In a screen off and/or pre-power on mode, a sub processor (not shown) operates. In the screen off and/or pre-power on mode, the controller 110 which includes a sub processor (not shown) can be operated.

A plurality of processors may include a main processor, a sub processor, and a sensor processor (not shown) which controls a sensor. In addition, a plurality of processors may include a main processor and a sensor processor (not shown).

The processor 111, ROM 112, and RAM 113 can be interconnected via an internal bus.

The controller 110 controls the user detector (e.g., camera 145) which detects a user motion, a display 170, a power supplier 190, and a communicator 130 which receives control information from a remote controller 200 and, in response to the detected user motion and first control information received from the remote controller 200, controls to display a preset screen on a part of the display 170, and in response to second control information received from the remote controller 200, controls to display a content on the display 170.

The controller 110 displays an image stored in the display apparatus on a portion of the display 170 at a first mode, and displays content from an external (apparatus) on a whole of the display 70 at a second mode.

The controller 110, in response to the detected user motion, may control to change a state of the display apparatus from power off mode to a pre-power on mode, and the controller may control the power supplier 190 to supply power to all parts of the display apparatus except for the display 170.

The controller 110 may control to receive the first control information via one of the communicator 130 and the optical receiver 150.

The controller 110, in response to receipt of the first control information, may control the power supplier 190 to provide power to the display 170 and to display the preset screen on the display 170.

The controller 110 may control so that the preset screen is displayed at a part of an area of the display 170 to which power is supplied.

The controller 110 may control the power supplier 190 to supply power which is different from the power that is supplied to a preset screen to a remainder of an area of the display 170.

The controller 110, in response to receipt of the first control information, may control the power supplier 190 to supply power to an audio outputter 175, and output auditory feedback to the audio outputter 175.

The controller 110 may control to receive the second control information via one of the communicator 130 and the optical receiver 150.

The controller 110, unlike the display 170 of which power is off, may control the power supplier 190 to continuously provide power to the user detector (e.g., camera 145).

The controller 110 may include a main processor and a sub processor, and the user detector may be controlled by the sub processor.

In an exemplary embodiment, the term "controller of the display apparatus 100" includes a processor 111, ROM 112, and RAM 113 of the display apparatus 100. In addition, the term "controller of the display apparatus 100" may include a main processor (not shown), a sub processor (not shown), ROM 112, and RAM 113 of the display apparatus 100.

That the configurations and operations the controller 110 could have been variously implemented according to exemplary embodiments may be easily understood by those of ordinary skill in the art.

A tuner 120 may select a frequency of a channel which the display apparatus 100 wishes to receive, through amplification, mixing, and resonance of a broadcast signal which is received via wire or wirelessly. Broadcast signal includes video, audio, and additional data (for example, electronic program guide (EPG)).

The tuner 120 may receive video, audio, and/or data from a frequency band which corresponds to a channel number (for example, cable broadcast channel 605) that corresponds to a user input (for example, control information-channel number input received from the remote controller 200, channel up-down input, etc.).

The tuner 120 may receive a broadcast signal from any of various sources, such as ground wave broadcasting, cable broadcasting, satellite broadcasting, and Internet broadcasting. The tuner 120 may receive a broadcast signal from sources such as analog broadcast or digital broadcast. The tuner 120 may be realized as an all-in-one type with the display apparatus 100 or a separate device (for example, a set-top box (not shown), or a tuner (not shown) connected to inputter/outputter 160).

The communicator 130 may connect the display apparatus 100 with the remote controller 200 or the electronic device (not shown) by control of the controller 110. The controller 110, via the communicator 130, may download an application from outside or perform web browsing. In addition, the communicator 130 may receive control information that corresponds to control of the display apparatus 100 from the remote controller 200 by control of the controller 110.

The communicator 130, in response to performances and structures of the display apparatus 100, may include any one of wire Ethernet 131, wireless local area network (LAN) communicator 132, and near field communicator 133. In addition, the communicator 130 may include the combination of Ethernet 131, wireless LAN communicator 132, and local network communicator 133.

The communicator 130, according to an exemplary embodiment, may receive control information transmitted from the remote controller 200. In addition, the near field communicator 133 may receive control information transmitted from the remote controller 200 by control of the controller 110.

A microphone 140 receives user's utterance. The microphone 140 may convert received voice to an electrical signal and output the electrical signal to the controller 110. User voice, for example, may include voice that corresponds to a menu of the display apparatus 100 or control of functions. A scope of recognition of the microphone 140 may vary in response to a user's voice volume and an ambient environment (for example, speaker sound, nearby noise).

The microphone 140 may be realized as an all-in-one type that is integral with the display apparatus 100, or can be separably implemented. The separated microphone 140 can be electrically connected to the display apparatus 100 via the communicator 130 or inputter/outputter 160.

The camera 145 photographs a video (for example, serial frames) which corresponds to a user motion in a camera recognition scope. The user motion, for example, can include any of a presence of a user (for example, a user appears in the camera recognition scope) a part of the body such as face, facial expression, hands, fist, and fingers or a motion of a part of the body of a user. The recognition scope of the camera 145 can be within a distance of between approximately 0.2 meters and 5 meters from the camera 145 to a user.

The camera 145 may consist of a lens (not shown) and an image sensor (not shown). The camera 145 may support an optical zoom function and/or a digital zoom function that use a plurality of lenses and image processing.

The camera 145 may be located at any one of an upper side, a lower side, a left side, and a right side of the display apparatus 100. In addition, the camera 145 may be located at any one of an upper central area, a lower central area, a lower central area, and a lower left area of the display apparatus 100.

The camera 145, according to an exemplary embodiment, may photograph a user (or a user motion) in the display apparatus 100 which is powered off (except that a power plug is connected to a power consent) by supply of power of the power supplier 190.

The camera 145 may convert a video photographed by control of the controller 110 to an electrical signal and output the electrical signal to the controller 110. The controller 110, by analyzing a photographed video, recognizes a user motion. The controller 110, by using a motion recognition result, may display a menu on the display apparatus 100 or perform a control (for example, channel adjustment or volume adjustment, etc.) that corresponds to the motion recognition result.

When the camera 145 includes a plurality of cameras, in a front surface of the display apparatus 100, by using a second camera (not shown) which is adjacent (for example, space between the first camera (not shown) and a second camera (not shown) is greater than 10 mm and less than 80 mm) to the first camera (not shown), a 3D still image or a 3D motion can be received.

The camera 145 may be implemented as an all-in-one type that is integrated with the display apparatus 100 or may be separated. The electronic device (not shown) including the separated camera can be electrically connected to the display apparatus 100 via inputter/outputter 160.

The optical receiver 150 receives an optical signal (which may include control information) output from the remote controller 200 via a wide window (not shown).

The optical receiver 150 may receive, from the remote controller 200, an optical signal which corresponds to user input (for example, any of a touch, a press, a touch gesture, voice, or motion). From the received optical signal, control information can be extracted. A received optical signal and/or extracted control information can be transmitted to the controller 110.

The inputter/outputter 160, by control of the controller 110, receives contents from outside of the display apparatus 100. Contents, for example, may include any of video content, an image, text, or a web document. In addition, contents may include video that includes advertisements, an image that includes an advertisement, or web documents that include advertisements.

The inputter/outputter 160 may include an HDMI input port (High-Definition Multimedia Interface port) 161 that corresponds to receipt of contents, a component input jack 162, a PC input port 163, and a USB input jack 164. The inputter/outputter 160 may be added, deleted and/or changed according to performances and structure of the display apparatus 100, and this may be easily understood by those of ordinary skill in the art.

The display 170 displays video included in a broadcast signal received via the tuner 120 by the control of the controller 110. The display 170 may display contents (for example, video) input via the communicator 130 or inputter/outputter 160. The display 170 may output contents stored in the storage 180 by the control of the controller 110. In addition, the display 170 may display a voice user interface (UI) for performing a voice recognition task that corresponds to voice recognition or a motion UI for performing a motion recognition task. For example, voice UI may include a voice command guide and the motion UI may include a motion command guide.

A screen of the display apparatus 100, according to an exemplary embodiment, may be used as a term that includes the display 170 of the display apparatus 100.

The display 170, according to an exemplary embodiment, may display a welcome screen that corresponds to the first control signal received from the remote controller 200 by the control of the controller 110.

According to another exemplary embodiment, the display 170 may be separated from the display apparatus 100. The display 170, via the inputter/outputter 160 of the display apparatus 100, may be electrically connected to the display apparatus 100.

An audio outputter 175 outputs audio included in a broadcast signal received via the tuner 120 by the control of the controller 110. The audio outputter 175 may output audio (for example, audio that corresponds to voice and sound) input via the communicator 130 or the inputter/outputter 160. In addition, the audio outputter 175 may output an audio file stored in the storage 180 by the control of the controller 110.

The audio outputter 175 may include any one of a speaker 176, a headphone output terminal 177, or an S/PDIF output terminal 178. In addition, the audio outputter 175 may include a combination of a speaker 176, a headphone output terminal 177, and/or an S/PDIF output terminal 178.

The audio outputter 175, according to an exemplary embodiment, may output auditory feedback that corresponds to a display of a welcome screen according to the first control signal received from the remote controller 200 by the control of the controller 110 of the display apparatus 100.

The storage 180, by the control of the controller 110, may store various data, programs, and/or applications to drive and control the display apparatus 100. The storage 180 may store an input/output signal and/or data that corresponds to the tuner 120, the communicator 130, the microphone 140, the camera 145, the optical receiver 150, inputter/outputter 160, the display 170, audio outputter 175, and the power supplier 190.

The storage 180 may store any one or more of a control program for controlling the display apparatus 100 and the controller 110, an application initially provided by a manufacturer or downloaded from outside, a GUI related to an application, an object for providing GUI (for example, image text, icon, button, etc.), user information, documents, database, and/or relevant data.

The storage 180 may include any one or more of a broadcast receipt module, a channel control module, a volume control module, a communication control module, a voice recognition module, a motion recognition module, an optical receipt module, a display control module, an audio control module, an external input control module, a power control module, a voice database, and/or a motion database which are not illustrated. Not illustrated modules of storage unit and database may be implemented as software which is configured to perform any one or more of a broadcast receipt control function, a channel control function, a volume control function, a communication control function, a voice recognition function, a motion recognition function, an optical receipt control function, a display control function, an audio control function, an external input control function, and/or a power control function of the display apparatus 100. The controller 110, by using the software stored in the storage 280, may perform a function of the display apparatus 100.

The storage 180 may store display apparatus information and/or remote controller information.

The storage 180 may store video, image, and/or text that corresponds to visual feedback.

The storage 180 may store sound that corresponds to auditory feedback.

The storage 180 may store a feedback providing time (for example, 300 ms) of feedback provided to a user.

In the exemplary embodiment, the term "storage" can be used to include any of the storage 180, storage (not shown) implemented as ROM 112, RAM 113, SoC (not shown) of the controller 110, memory card (for example, micro SD card, USB memory (not shown)) stored in the display apparatus 100, and/or external storage unit connectable to the USB port 164 (for example, USB memory (not shown)) of the inputter/outputter 160. In addition, the storage may include any of non-volatile memory, volatile memory, hard disk drive (HDD), and/or solid state drive (SDD).

The power supply 190 supplies power input from an external power source to the components 110-190 inside the display apparatus 100 by the control of the controller 110. A power supplier 190, by the control of the controller 110, may provide power input from one or two or more batteries (not shown) to internal components 120-190 located inside the display apparatus 100.

The power supplier 190 may include the first power supplier (not shown) which supplies power to the camera 145 of the display apparatus 100 which is powered off (or only the screen of the display apparatus 100 is powered off, while the power plug is connected to a power consent) and to a sub processor (not shown) or a sensor processor which controls the camera 145 of the display apparatus.

The power supplier 190 may include a battery (not shown) which provides power to the camera 145 of the display apparatus 100 which is powered off (except that a power plug is connected to a power consent).

As to the components (for example, 120-190) illustrated in the display apparatus 100 in FIGS. 1 and 2, in response to performances and/or types of the display apparatus 100, at least one component can be added, changed, or deleted (for example, at least one of a box illustrated in dotted lines). In addition, that the respective locations (for example, 120-190) of the components can be changed in response to performances or structure of the display apparatus 100 may be easily understood by those of ordinary skill in the art.

Hereinbelow, a case of controlling a screen of the display apparatus will be explained in greater detail.

Referring to FIG. 2, the remote controller 200 which remotely controls the display apparatus 100 includes a controller 210, a communicator 230, an inputter 260, an optical outputter 250, a display 270, a storage 280, and a power supplier 290. The remote controller 200 may include one of the communicator 230 and the optical outputter 250. In addition, the remote controller 200 may include all of the communicator 230 and the optical outputter 250.

The remote controller 200 may be used as a term which indicates an electronic device which can control the display apparatus 100. In addition, the remote controller 200 may include an electronic device which can install (or download from outside) an application (not shown) for controlling the display apparatus 100.

The electronic device which can install the application (not shown) for control of the display apparatus 100 can include a display (for example, there is only a display panel without a touch screen or a touch panel). The electronic device having a display may include any of a cell phone (not shown), smart phone (not shown), tablet PC (not shown), note PC (not shown), other display apparatuses (not shown), and/or home appliances (for example, refrigerator, washing machine, or cleaning machine). A user may control the display apparatus 100 by using a function key (for example, a channel key (not shown) in a graphic user interface (GUI, not shown) provided by the application which is running.

The controller 210 may include a processor 211, ROM (or non-volatile memory) 212 where a control program to control the remote controller 200 is stored, and RAM (or volatile memory) 213 which stores a signal or data input from outside the remote controller 200 or used as a storage area for various jobs executed in the remote controller 200.

The controller 210 controls overall operations of the remote controller 200 and signal flow among internal components 220-290 of the remote controller 200, and performs a function to process data. The controller 210 controls a power supply to internal components 220-290 by using the power supplier 290.

The controller 210 controls a sensor to detect a motion of the remote controller, a power button to turn on the display apparatus, a communicator connected to the display apparatus, the sensor, and the communicator, and controls to transmit first control information which corresponds to a motion of the detected remote controller and second control information which corresponds to a selection of the power button to the display apparatus via the communicator.

The controller 210 may control a transmission of at least one of the first control information and the second control information to the display apparatus via the optical outputter 250.

The controller 210 may provide haptic feedback and auditory feedback in response to at least one of the transmission of the first control signal and the second control signal.

In an exemplary embodiment, the term "the controller 210" may include the processor 211 of the remote controller 200, ROM 212, and RAM 213.

The communicator 230, by the control of the controller 210, may transmit the control information (for example, control information that corresponds to power on, or control information that corresponds to a motion of the remote controller) which corresponds to user input (for example, a touch, a press, a gesture, a voice, or a motion) to the display apparatus 100. The communicator 230, by the control of the controller 210, may be wirelessly connected to the display apparatus 100. The communicator 230 may include at least one of the wireless LAN communicator 231 and near field communicator 232 (for example, one of wireless LAN communicator 231 and near field communicator 232, or both of the wireless LAN communicator 231 and near field communicator 232).

Wireless LAN 231 can be wirelessly connected to AP by control of the controller 210 at a place where AP is installed. The wireless LAN 131, for example, may include wireless fidelity (Wi-Fi). The wireless LAN 131 supports wireless LAN (IEEE802.11x) of IEEE. In addition, the near field communicator 132 may be connected via near field communication between the mobile device 100 and an external device wireless without AP by the control of the controller 110. Near field communication, for example, may include any of Bluetooth, Bluetooth low energy, infrared data association (IrDA), Ultra Wideband (UWB), or near field communication (NFC).

The inputter 260 may include a button 261 and/or a touch pad 262 configured to receive an input (for example, a touch or a press) of a user for control of the display apparatus 100. The inputter 260 may include the microphone 263 which receives uttered user voice, the sensor 264 for detecting a motion of the remote controller 200, and/or a vibration motor (not shown) providing haptic feedback.

The inputter 260 may output an electrical signal (for example, an analog signal or a digital signal) that corresponds to a received user input (for example, a touch, a press, a touch gesture, a voice, or a motion) to the controller 210.

A button 261 may include buttons 261a, 261b, 261c, 261d, 261e of FIG. 1. The touch pad 262 may receive a user touch or user's touch gesture. Referring also to FIG. 1, the touch pad 262 can be implemented as an area where a direction key 262a and an enter key 262b are located. In addition, the touch pad 262 can be located at a front surface of the remote controller 200 where keys 261a to 261e are not located.

The microphone 263 receives a user's uttered voice. The microphone 263 may convert received voice to an electrical signal and output the converted electrical signal to the controller 210.

The sensor 264 may detect an internal state and/or external state of the remote controller 200. For example, a state can be respectively measured by a motion sensor (not shown) which detects a motion of the remote controller 200, a gyro sensor (not shown) which detects a direction by using a rotation inertia of the remote controller 200, an acceleration sensor (not shown) which detects a speed and/or a rate of acceleration of three axes (for example, X-axis, Y-axis, and Z-axis) added to the remote controller 200, or a gravity sensor which detects a direction of gravity. The sensor 264 may respectively measure motion acceleration speed or gravity acceleration speed of the remote controller 200.

According to an exemplary embodiment, the sensor 264 may detect a motion (or an acceleration or a speed) of the remote controller 200 caused by a user. The controller 210 may generate a control signal that corresponds to a motion of the remote controller 200 and transmit the communicator 230 to the display apparatus 100.

A vibration motor (not shown) may convert an electrical signal to a mechanical vibration by the control of the controller 210. For example, the vibration motor (not shown) may include any of a linear vibration motor, a bar-type vibration motor, a coin-type vibration motor, and/or a piezoelectric element. When control information is received from the display apparatus 100, the controller 210 of the remote controller 200 can operate a vibration motor (not shown). One or more vibration motors (not shown) can be located inside the remote controller 200. In addition, the vibration motor (not shown) can cause the entire remote controller 200 to vibrate or cause a part of the remote controller 200 to vibrate.

According to an exemplary embodiment, the vibration motor (not shown) may output haptic feedback that corresponds to a transmission of control information according to control of the controller 210. Based on control information transmitted by the control of the controller 210, the vibration motor (not shown) can provide various types of haptic feedback (such as, for example, strength of vibration corresponding to various haptic patterns and vibration continuation time stored in the storage 280).

The optical outputter 250 outputs an optical signal (for example, including control information) that corresponds to user input (for example, a touch, a press, a touch gesture, a voice, or a motion) by the control of the controller 210. The outputted optical signal can be received at the optical receiver 150 of the display apparatus 100. A remote controller code format used in the remote controller 200 may include one of a manufacturer-exclusive remote controller code format and a commercial remote controller code format. The remote controller code format may include a leader code and data word. The outputted optical signal can be modulated by carrier wave and outputted. Control information can be stored in the storage 280 or may be generated by the controller 210. The remote controller 200 may include IR-LED (infrared-laser emitting diode).

The remote controller 200 may include one or both of the communicator 230 which can transmit control information to the display apparatus 100 and the optical outputter 250.

The controller 210 may output control information that corresponds to a user input to the display apparatus 100 via one of the communicator 230 and the optical outputter 250. In addition, the controller 210 may output control information that corresponds to a motion of the remote controller 200 to the display apparatus 100 via one of the communicator 230 and the optical outputter 250.

The controller 210 may transmit, to the display apparatus 100, control information that corresponds to a user input and/or control information that corresponds to a motion of the remote controller 200 in a prior manner via one of the communicator 230 and the optical outputter 250 (for example, the communicator 230).

The display 270, for example, may include a display in types of any of an LCD (liquid crystal display), an OLED (Organic Light Emitting Diodes), a PDP (Plasma Display Panel), and/or a VFD (Vacuum fluorescent display).

The display 270 may display a broadcast channel number, a broadcast channel name displayed on the display apparatus 100, and/or a state of the display apparatus (for example, screen off, pre-power mode, welcome mode and/or normal mode).

When the remote controller 200 and the display apparatus are connected by near field communication, the display 270 may display a text that indicates "BT connected" or "NFC connected" by control of the controller 210.

When an optical signal is outputted from the remote controller 200 to the display apparatus 100, the display 270 may display text, an icon, or a symbol that corresponds to, by the control of the controller 210, "TV on" to indicate a turning on power of the display apparatus 100, "TV off" to indicate a powering off the display apparatus 100, display selected channel numbers "Ch No.", and/or "Vol value" to indicate an adjusted volume.

The storage 280 may store various data, programs, and/or applications to drive and control the remote controller 200 by the control of the controller 210. The storage 280 may store input or output signals and/or data that corresponds to driving of the communicator 230, optical outputter 250, and power supplier 290. The storage 280 may store control information that corresponds to a user input (for example, a touch, a press, a touch gesture, a voice, or a motion) received by the control of the controller 210 and/or control information that corresponds to a motion of the remote controller 200.

The storage 280 may store information that relates to a remote controller that corresponds to the remote controller 200. The remote controller information may include any of a model name, a device identification (ID), a remaining memory amount, object data existence, a Bluetooth version, and/or a Bluetooth profile.

The storage 280 may store the first control information which corresponds to a motion of the remote controller 200 which is transmitted to the display apparatus 100. The first control information may include a group of each of the first control information that corresponds to a motion of the remote controller 200.

The storage 280 may store the second control information that corresponds to a selection of a power button 261a transmitted to the display apparatus 100.

The storage 280 may store one or two or more haptic patterns. The haptic patterns can be expressed as a wave form. The haptic patterns, for example, may indicate a vibration time (for example, a unit is 50 ms) of a vibration motor (not shown) in a width axis, and a strength of vibration (for example, a unit is 500 mV) of a vibration motor (not shown) in a length axis. The first haptic pattern may be a vibration which gradually increases from 0 V to 800 mV, gradually decreases to 100 mV, and repeatedly increases again. In addition, a speed increasing section and a speed decreasing section may be symmetrical.

The second haptic pattern may be a vibration which gradually increases from 0 V to 900 mV, sharply decreases to 500 mV, gradually decreases 200 mV, and increases again. In addition, the third haptic pattern may be a vibration which gradually increases from 0 V to 950 mV, sharply decreases to 100 mV, and then increases again.

When there are a plurality of haptic patterns, one pattern from among a plurality of haptic patterns can be stored as a favorite haptic pattern. When the favorite haptic pattern is set, the controller 210 may provide haptic feedback via a vibration motor (not shown) with the favorite haptic pattern being preferentially employed.

In response to a function or structure of the remote controller 200, that the haptic pattern can be added, changed, or deleted may be easily understood by those of ordinary skill in the art.

The power supplier 290 provides power to the components 220-290 of the remote controller 200 by the control of the controller 210. The power supplier 290 may supply power to the components 210-290 from one or two or more batteries (not shown) located in the remote controller 210. A battery can be located at a surface (for example, there is a key 261 or a touch pad 262) of the remote controller 200, or an inner side between the surface and a rear side (not shown).

The components illustrated in the remote controller 200 of FIGS. 1 and 2 can be added or deleted (for example, at least a box in a dotted line) in response to the performance of the remote controller 200. In addition, that respective positions of the components can be changed in response to a performance or a structure of the remote controller 200 may be easily understood by those of ordinary skill in the art.

FIG. 3 is a flowchart illustrating a method for controlling a screen of a display apparatus, according to an exemplary embodiment.

FIG. 4 is a sequence diagram illustrating a method for controlling a screen of a display apparatus, according to an exemplary embodiment.

FIGS. 5A, 5B, 5C, 5D, and 5E are drawings illustrating a method for controlling a screen of a display apparatus, according to an exemplary embodiment.

At the operation S310 of FIG. 3, the display apparatus and the remote controller are connected via near field communication, and a screen of the display apparatus is powered off.

Figure 5A:
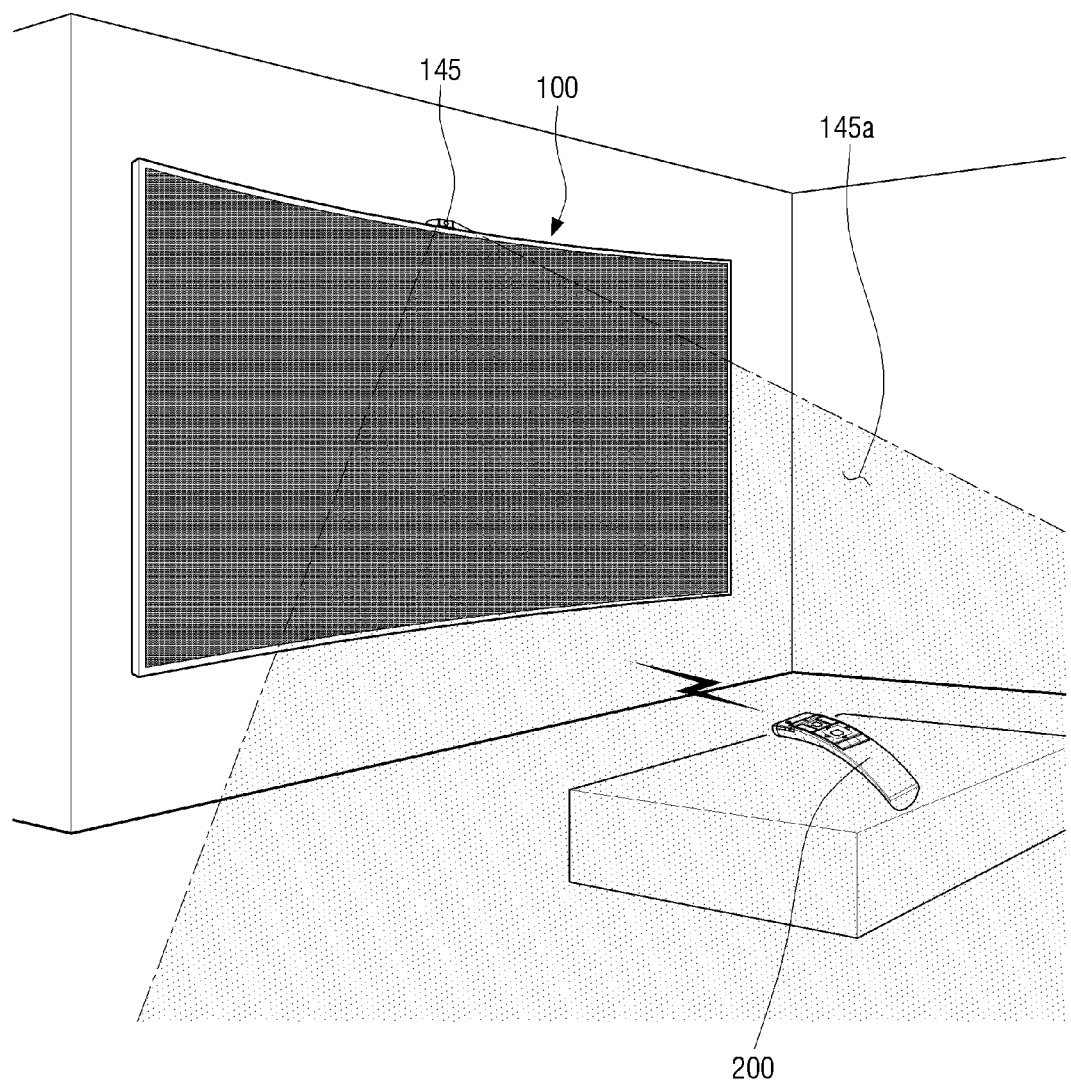
FIGS. 5A, 5B, 5C, 5D, and 5E are drawings illustrating an example of a method for controlling a screen of a display apparatus, according to an exemplary embodiment.

Referring to FIGS. 4 and 5A, the display apparatus 100 is connected to the remote controller 200 via near field communication (operation 401).

The display apparatus 100 and the remote controller 200 are connected via near field communication. In addition, when the display apparatus 100 and the remote controller 200 are connected initially, the controller 210 of the remote controller 200, by using a near field communicator (for example, Bluetooth 132), may search the display apparatus 100. The controller 210 of the remote controller 200 can query the display apparatus 100 and request a connection (page) for the queried display apparatus 100.

The storage 280 may store connection information of the display apparatus that corresponds to the display apparatus 100 connected to the remote controller 200 by the control of the controller 210. The stored display apparatus connection information may include any of an SSID of an identifier (identification information) of a display apparatus, a MAC address, a model name, a manufacturer, operation information (for example, busy, standby, etc.), capability, version, and/or context information.

In addition, the display apparatus 100, through near field communication (for example, Bluetooth low energy, etc.) periodically (for example, at intervals of 20 ms to 1024 s, changeable) transmits an advertising packet to outside surroundings. For example, an advertising packet may include an SSID of an identifier (identification information) of a display apparatus, a MAC address, a model name, a manufacturer, operation information (for example, busy, standby, etc.), capability, version, and/or context information.

The advertising packet transmitted from the display apparatus 100 to the outside is one exemplary embodiment and is not limited thereto. It may be sufficient that the advertising packet includes a part or whole of display apparatus information which includes identification information of the display apparatus 100. When a part or whole of display apparatus information is received by the remote controller 200 through near field communication, the remote controller 200 may analyze a part or whole of the received display apparatus information and connect with the display apparatus 100 through near field communication.

The controller 210 of the remote controller 200 may transmit control information to the display apparatus 100 by using display apparatus connection information.

That the items included in display apparatus connection information can be changed, added, or deleted in response to a function (or performance, or structure, etc.) of the display apparatus may be easily understood by those of ordinary skill in the art.

Referring to FIGS. 4 and 5A, a screen of the display apparatus is powered off (operation 402).

A screen of the display apparatus 100 can be powered off by a user. For example, a screen of the display apparatus 100 can be powered off by using the remote controller 200. In addition, a screen of the display apparatus 100 can be powered off by a operation of a panel key (not shown) positioned in a rear side (for example, a surface of a bottom sash) of the display apparatus 100.

When a screen of the display apparatus 100 is powered off (or the display apparatus 100 is powered off), the display apparatus 100 is connected to a power consent via a power cable. When a screen of the display apparatus 100 is powered off (or the display apparatus 100 is powered off), power can be provided to a sub processor (not shown).

When a screen of the display apparatus 100 is powered off, power is continuously supplied to the camera 145 and a user motion can be detected.

When a screen of the display apparatus 100 is powered off, the camera 145 of the display apparatus 100 of which screen is power off can be supplied with power by the first power supplier (not shown). In addition, when a screen of the display apparatus 100 is powered off, the camera 145 of the display apparatus 100 for which the screen is powered off by the first power supplier (not shown) and a sub processor (not shown) which controls the camera 145 can be supplied with power continuously.

Referring to FIG. 5A, in a recognition scope of the camera 145 of the display apparatus 100 for which a screen is powered off, a user motion is not detected. When a screen of the display apparatus 100 is powered off, a connection between the display apparatus 100 and the remote controller 200 through near field communication can be maintained or disconnected.

At operation S320 of FIG. 3, a user motion is detected in the display apparatus.

Figure 5B:
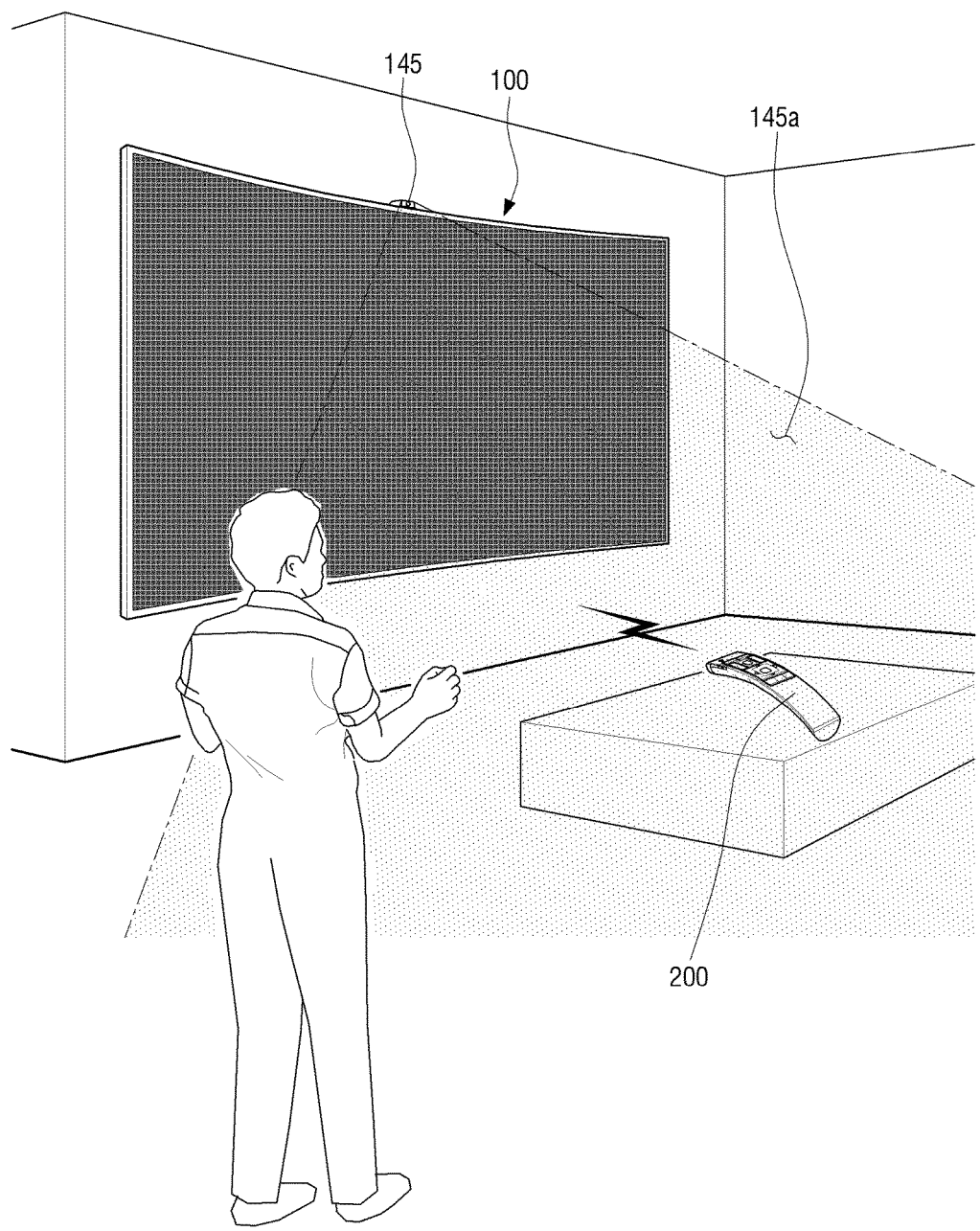

Referring to FIGS. 4 and 5B, a presence of a user can be detected by the camera 145 of the display apparatus 100 (operation 403).

A user can enter into a recognition scope of the camera 145 of the display apparatus 100. The camera 145 may photograph a user motion (i.e., a user's presence (for example, a user makes a presence in a camera recognition scope), a part of a user's body such as a user's face, facial expression, hands, fist, or a motion of a part of a user's body in a frame unit (for example, 15, 30, 60 frames per second, changeable). The camera 145 may transmit data that corresponds to a user motion to a sub processor (not shown).

The camera 145 may photograph a previous frame (for example, a user is not present) and a current frame (for example, a user is present). The sub processor (not shown) which controls the camera 145 can analyze each of the photographed frame. The sub processor (not shown) may compare and analyze a previous frame (for example, a user is not present) with respect to a current frame (for example, the user is present). The sub processor (not shown) may detect a user motion through analysis.

The display apparatus 100 may include a separate exclusive processor (not shown) which controls the camera 145. When the exclusive processor controls the camera 145, the exclusive processor (not shown) may analyze and detect a user motion. When the exclusive processor controls the camera 145, the sub processor (not shown) may control other components (for example, a sensor or the first power supplier, etc.) other than the camera 145.

It has been described above that the camera 145 is used for detecting a user motion (for example, presence of a user, etc.), however, not only the camera 145 but also any of a radio frequency sensor (RF sensor, not shown) which uses the Doppler effect, a pyroelectric infrared sensor (PIR sensor, not shown) which uses infrared rays and/or the microphone 140 can be used, as may be easily understood by those of ordinary skill in the art.

In an exemplary embodiment, the camera 145 which detects a user motion and various sensors can be referred to as the user detectors.

At operation S330 of FIG. 3, the operational mode of the display apparatus is changed to a pre-power on mode.

Figure 5C:
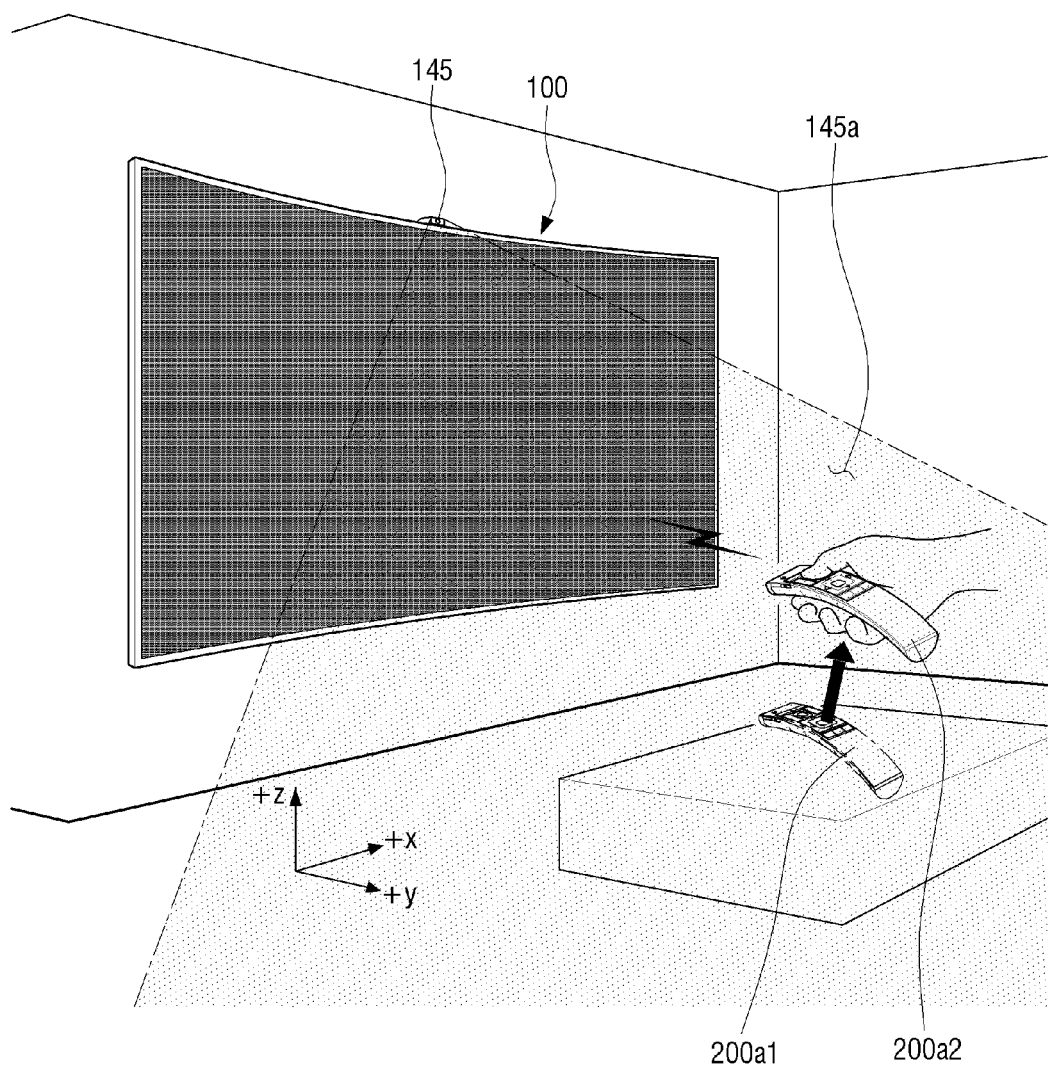

Referring to FIGS. 4 and 5C, when a user motion is detected, the operational mode of the display apparatus 100 can be changed from a screen off to a pre-power on mode (operation 404).

When a user motion is detected, a sub processor (not shown) can wake up a main processor (not shown). In addition, the exclusive processor (not shown) of the camera 145 can wake up the main processor (not shown).

In response to an operation of a main processor (not shown), the controller 110 of the display apparatus 100 can change to a pre-power on mode.

In response to detection of a user motion, a state of the display apparatus 100 can be changed to a pre-power on mode after time of 0.3 second to 1 second elapses. In a pre-power on mode of the display apparatus 100, a screen is continuously powered off (for example, a screen is not woken up). In a pre-power on mode of the display apparatus 100, the controller 110 may control the power supplier 190 not to supply power to the screen (the display 170). In addition, in a pre-power on mode of the display apparatus 100, the controller 110, in contrast to a normal mode (for example, power consumption is different) where a broadcast channel is displayed on a screen 170, may control the power supplier 190 to supply power.

In a pre-power on mode of the display apparatus 100, the audio outputter 175 may be powered off (for example, it may not be woken up). In a pre-power on mode of the display apparatus 100, the controller 110 may control the power supplier 190 not to supply power to the audio outputter 175. In addition, in a pre-power on mode of the display apparatus 100, the controller 110, in contrast (for example, power consumption is different) to a normal mode which outputs sound to the audio outputter 190, may control the power supplier 190 to supply power.

In response to a detection of a user motion, the storage 180 may store user motion detection information by the control of the controller 110. The user motion detection information, for example, may include any of a user motion detection ID for history management, a user motion detection time, a detected user motion (for example, user authentication through face recognition), and/or a pre-power on mode change time, etc.

In the display apparatus 100 which is in a pre-power mode, during a setting time (for example, 5 minutes, although the setting time may be changed), when the first control signal is not received from the remote controller 200, a state of the display apparatus 100 may return to a screen power off mode from a pre-power on mode.

At operation S340 of FIG. 3, a control signal that corresponds to a detection of a motion of the remote controller is received through near field communication.

Referring to FIGS. 4 and 5C, in the sensor 264 of the remote controller 200, a motion of a remote controller is detected (operation 405).

A user may grip and move the remote controller 200 which has been placed on a table. In addition, a user who is detected by the user detector of the display apparatus 100 may grip and move the remote controller 200 which has been placed on a table. A user may move the remote controller 200 from a first position 200a1 to a second position 200a2.

The controller 210 of the remote controller 200 may detect a motion (or acceleration, speed, etc.) of the remote controller 200. A motion of the remote controller 200 is detected by the sensor 264. A movement of the remote controller 200 can be periodically detected (for example, movement of the remote controller 200 can be detected by a sensor). The sensor 264, in response to a movement of the remote controller 200, may output an analog signal to the controller 210. In addition, an analog signal output from the sensor 264 can be converted to a digital signal by a converter (not shown). The converted digital signal can be output to the controller 210. The controller 210 of the remote controller 200 may analyze a signal received from the sensor 264 and determine a movement of the remote controller 200 (for example, a change in a moving distance or acceleration speed, etc.).

The storage 280 may store an analog signal detected by the controller of the controller 210 or a digital signal converted from the analog signal. Hereinbelow, s stored analog signal or digital signal is referred to as "remote controller motion detection information". Stored remote controller motion detection information may include a remote controller motion ID for history management, an acceleration value of the detected remote controller 200 (for example, 2 axis or 3 axis), a movement detection time of the remote controller 200, and/or a moving distance of the remote controller 200.

The remote controller motion detection information can be periodically stored, starting from the first position 200a1 of the remote controller 200 to the second position 200a2. The remote controller motion detection information may include a group of remote controller motion detection information which is stored in response to resolution of the sensor 264 and/or movement of the remote controller 200 in a detectable time interval.

The controller 210 may generate first control information by using the stored remote controller motion detection information. The controller 210, by using remote controller motion detection information which is periodically stored, may generate the first control information. The first control information may be generated from the first position 200a1 to the second position 200a2. In addition, the controller 210, by using stored remote controller motion detection information, may load or select the first control information stored in the storage 280. The first control information may include the control information which can display a welcome screen 171 (see FIG. 5D) on a screen of the display apparatus 100.

Referring to FIGS. 4 and 5C, the controller 210 may transmit the first control information to the display apparatus 100 (operation 406).

The controller 210 may periodically transmit the first control information to the display apparatus 100 via one of the communicator 230 and the optical outputter 250. In addition, the controller 210 may periodically transmit the first control information which is generated from the first position 200a1 of the remote controller 200 to the second position 200a2.

When the first control information is transmitted via the optical outputter 250, a user may move the remote controller 200 for a set time. For example, the set time may be 300 ms (changeable upon setting). The setting time that corresponds to the first control information may indicate that, for a longer time than a signal frequency from the first leader code of the remote controller code format to a subsequent second leader code (for example, before a continuous code subsequent to the second leader code is output), the remote controller 200 is moved by a user.

That the setting time may vary according to a model or a manufacturer of the remote controller 200 may be easily understood by those of ordinary skill in the art.

When the first control information is transmitted through near field communication (for example, Bluetooth or Bluetooth low energy), the controller 210 of the remote controller 200 may transmit the first control information to the display apparatus 100 in a Bluetooth packet (not shown) type.

Bluetooth (not shown) includes an access code (72 bit) for determining whether a packet is valid, a header (54 bit) and a payload 0~2, 745 bit). The access code is used for whether packet is valid or not. The header includes a MAC (media access control) address and a packet type. The payload includes data to be transmitted, and a size of the payload varies according to a type of packets to be transmitted. Transmitted first control information may be included in a payload of a packet.

The communicator 130 of the display apparatus 100 may receive the first control information from the remote controller 200 by control of the controller 110. The display apparatus 100 may receive the first control information which is output from the remote controller 200 via the communicator 130. In addition, the display apparatus 100 receives the first control information output from the remote controller 200 via the optical receiver 150. The received first control information may be stored in the storage 180 by control of the controller 110.

At operation S350 of FIG. 3, a welcome screen which corresponds to a welcome mode is displayed on a screen of the display apparatus.

Figure 5D:
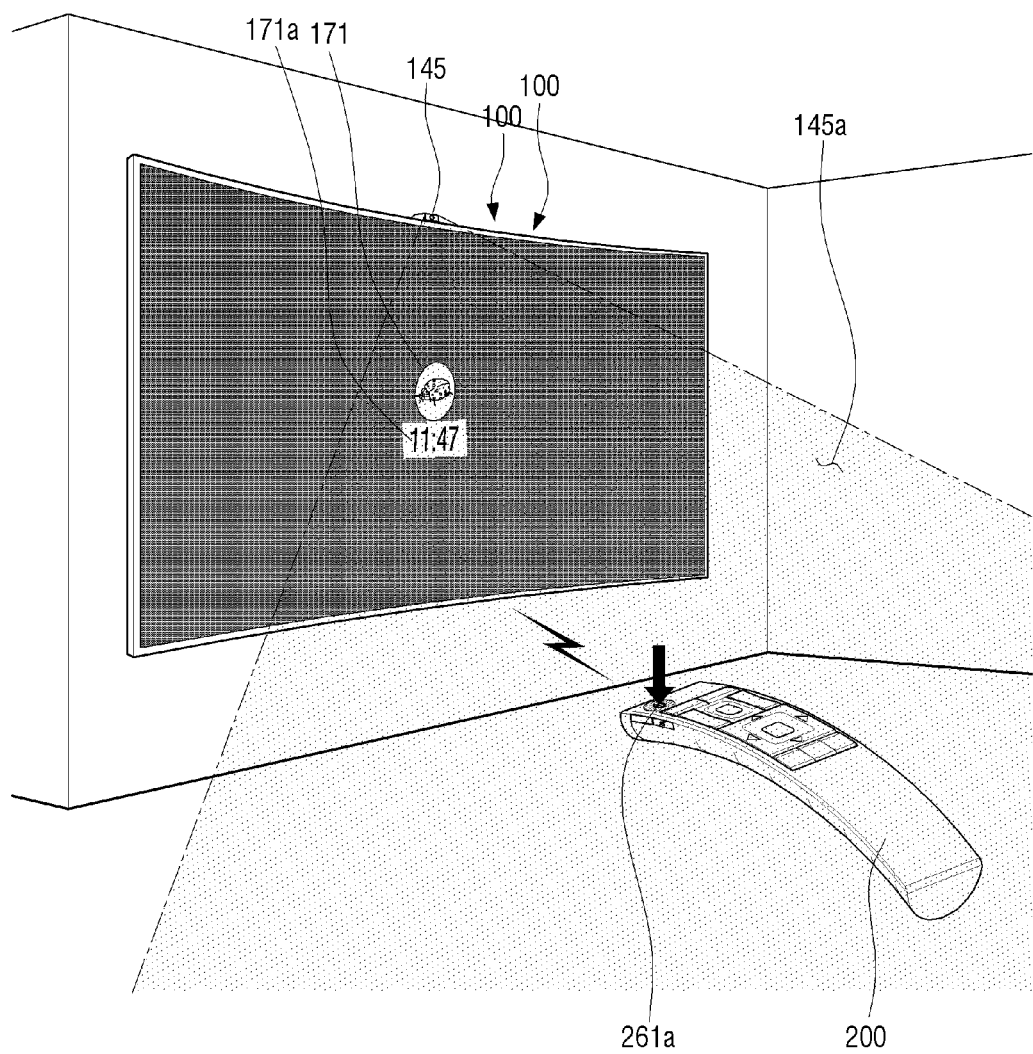

Referring to FIGS. 4 and 5D a welcome screen 171 which corresponds to a welcome mode is displayed on a screen of the display apparatus 100 (operation 407).

The controller 110 of the display apparatus 100, in response to receipt of the received control information, may change a state of the display apparatus 100 from a pre-power on mode to a welcome mode. In response to receipt of the first control information, the controller 110 of the display apparatus 100 can display a state of the display apparatus 100 on a welcome screen 171 after a time interval of 0.1 second to 0.4 second elapses.

In response to receipt of the first control information, the controller 110 of the display apparatus 100, for the time interval which is less than or equal to 0.4 seconds, may change a pre-power on mode to a welcome mode of the display apparatus 100 before a welcome screen 171 is displayed on the display apparatus 100.

In response to receipt of the first control information, the controller 110 may control to supply power to a screen (i.e., a display). In response to receipt of the first control information, the controller 110 may control the power supplier 190 to supply power to a screen 170 to correspond to a welcome mode which is different from a pre-power on mode (for example, power consumption is different).

In response to receipt of the first control information, the controller 110 may control to supply power to the audio outputter 175. In response to receipt of the first control information, the controller 110 may control the power supplier 190 to supply power to the audio outputter 175 to correspond to a welcome mode which is different from a pre-power on mode (for example, power consumption is different).

In response to receipt of the first control information, the storage 180 may store the first control information by the control of the controller 110.

The controller 110 of the display apparatus 100 may display the welcome screen 171 that corresponds to a change of a welcome mode on a screen. In an exemplary embodiment, the welcome screen 171 can be named a preset screen.

The welcome screen 171 may be a screen which is displayed to correspond to a change in an operational mode from a pre-power on mode to a welcome mode. The welcome screen 171 may be displayed as a shape which is set on a part of an area (for example, a central area of a screen) of the display apparatus 100. The remainder of the area on the display apparatus 100 may be background (for example, power off background).

The welcome screen 171 can be displayed by using power which is supplied to a part of an area of a screen of the display apparatus 100 by control of the controller 110. The welcome screen 171, which is different (for example, power consumption is different) from contents which are displayed on a screen 170 in a normal mode, may be a screen to which power is supplied to a part of the screen 170.

In a rest of an area of a screen of the display apparatus 100, power can be supplied in variable amounts by control of the controller 110. The controller 110 may control the power supplier 190 so that power is supplied differently at a rest of the area on a screen of the display apparatus 100 until the second control signal is received. In addition, on a screen of the display apparatus 100, the rest of the area can be displayed to be black, as power is supplied in variable amounts by control of the controller 110.

The partitioning of an area of a screen can be one of a left area and a right area when a screen is divided into two by equal division. A part of the area of a screen, when a screen is divided into upper and lower parts, can be one of an upper area and a lower area. A part of an area of the screen can be at least one of a left area, a central area, and a right area. A part of the area of a screen, when a screen is divided into three areas, the area can be at least one of an upper area, a central area, and a lower area.

A part of an area of a screen can be at least one of, when a screen is divided into four parts, a left quarter area, a central left quarter area, a central right quarter area and a right quarter area.

The part of the area described above is merely an exemplary embodiment, and that it can be applied to the case where a screen is divided into left and right to five or more parts, or into upper and lower parts to five or more parts (for example, division into 10 parts, 20 parts, etc.) may be easily understood by those of ordinary skill in the art. In addition, that a part of a screen can be divided into a matrix area (m×n, where m and n are natural numbers, for example, any of 2×2, 2×3, 3×3, 3×4, 4×4, 4×5, 5×5, such that the arrangement may be changed) may be easily understood by those of ordinary skill in the art. The welcome screen 171 can be displayed at a part of an area of a corner of a screen of the display apparatus 100.

The set shape of the welcome screen 171 may include any of a circle shape, an oval shape, and polygonal shape that includes an image on a surface. The set format of the welcome screen may be a 3D format which is displayed by a depth value on a 2D screen. The set shape of the welcome screen 171 can be displayed on a part of an area of the aforementioned screen. In addition, the set format of the welcome screen 171 may be displayed at a part of an area of a corner of the abovementioned screen.

The welcome screen 171 is displayed as a format which is set on a part of an area of a screen, and additional information 171a can be displayed together with the welcome screen 171. For example, additional information 171a may include time, data, weather (for example, see FIG. 5F), a greeting message (for example, see FIG. 5G) or set text (for example, today's schedule, contact list). On one side of the set format of the welcome screen 171, additional information 171a can be displayed together. For example, when the welcome screen 171 is a rectangular shape, a side of the set format can be a side inside the rectangular shape or a side outside the rectangular shape.

The controller 110 may provide visual feedback, such as an animation effect, to the welcome screen 171 displayed on a screen.

The controller 110, in response to the displaying of the welcome screen 171, may provide auditory feedback via the audio outputter 175 to which power is supplied. In the display apparatus 100 which is in a welcome mode, visual feedback and auditory feedback can be provided.

In the display apparatus 100 which is in a welcome mode, when a second control signal is not received from the remote controller 200 for a preset time (for example, 5 minutes, setting time can be changed), a state of the display apparatus 100 can be changed from a welcome mode to a pre-power on mode. When the first signal is not received from the display apparatus 100 which is in a pre-power on mode, a state of the display apparatus 100 can change to a screen power off mode.

At operation S360 of FIG. 3, a control signal that corresponds to a power button input is received from the remote controller.

Referring to FIGS. 4 and 5D, a power button 261a of the remote controller 200 receives a user input (operation 408).

A user may select a power button 261a of the remote controller 200. In addition, a user who is detected by the user detector of the display apparatus 100 can select a power button 261a of the remote controller 200. Selection of the power button 261a may include a press of the power button 261a, a touch of the power button 261a, and/or a touch gesture of the power button 261a. In addition, selection of the power button 261a can include a user voice input through the microphone 263 or a user gesture (for example, gripping the remote controller 200 and drawing a circle) detected by sensor 264.

The controller 210 of the remote controller 200 can store "power button selection information" that corresponds to the selection of the button 261a at the storage 280. The stored power button selection information may include power button selection information ID for history management, and/or power button selection time, and/or the like.

The controller 210, by using stored power button selection information, may generate the second control information. In addition, the controller 210, by using the stored power button selection information, may load or select the second control information which is stored at the storage 280. The second control information may include control information which may display contents (for example, broadcast channel, video 300) on a screen of the display apparatus 100.

Referring to FIGS. 4 and 5D, the controller 210 may transmit the second control information to the display apparatus 100 (operation 409). The controller 210 may transmit the second control information periodically to the display apparatus 100 by using one of the communicator 230 and the optical outputter 250.

When the second control information is transmitted via the optical outputter 250, a user can maintain the power button 261a for a setting time. For example, the setting time can be 300 ms (changeable upon setting). The setting time that corresponds to the second control information may indicate that, for a longer time than a signal frequency from the first leader code of the remote controller code format to a subsequent second leader code (for example, before a continuous code subsequent to the second leader code is output), the power button 261a is selected by a user.

That the setting time may vary according to a model or a manufacturer of the remote controller 200 may be easily understood by those of ordinary skill in the art.

When the second control information is transmitted through near field communication (for example, Bluetooth or Bluetooth low energy), the controller 210 of the remote controller 200 may transmit the second control information to the display apparatus 100 in a Bluetooth packet (not shown) type.

The communicator 130 of the display apparatus 100 may receive the second control information from the remote controller 200. The display apparatus 100 may receive the second control information which is output from the remote controller 200 via the communicator 130. In addition, display apparatus 100 receives the second control information which is output from the remote controller 200 via the optical receiver 150. The received second control information may be stored in the storage 180 by the control of the controller 110.

At operation S370 of FIG. 3, a broadcast channel is displayed on a screen of a display apparatus.

Figure 5E:
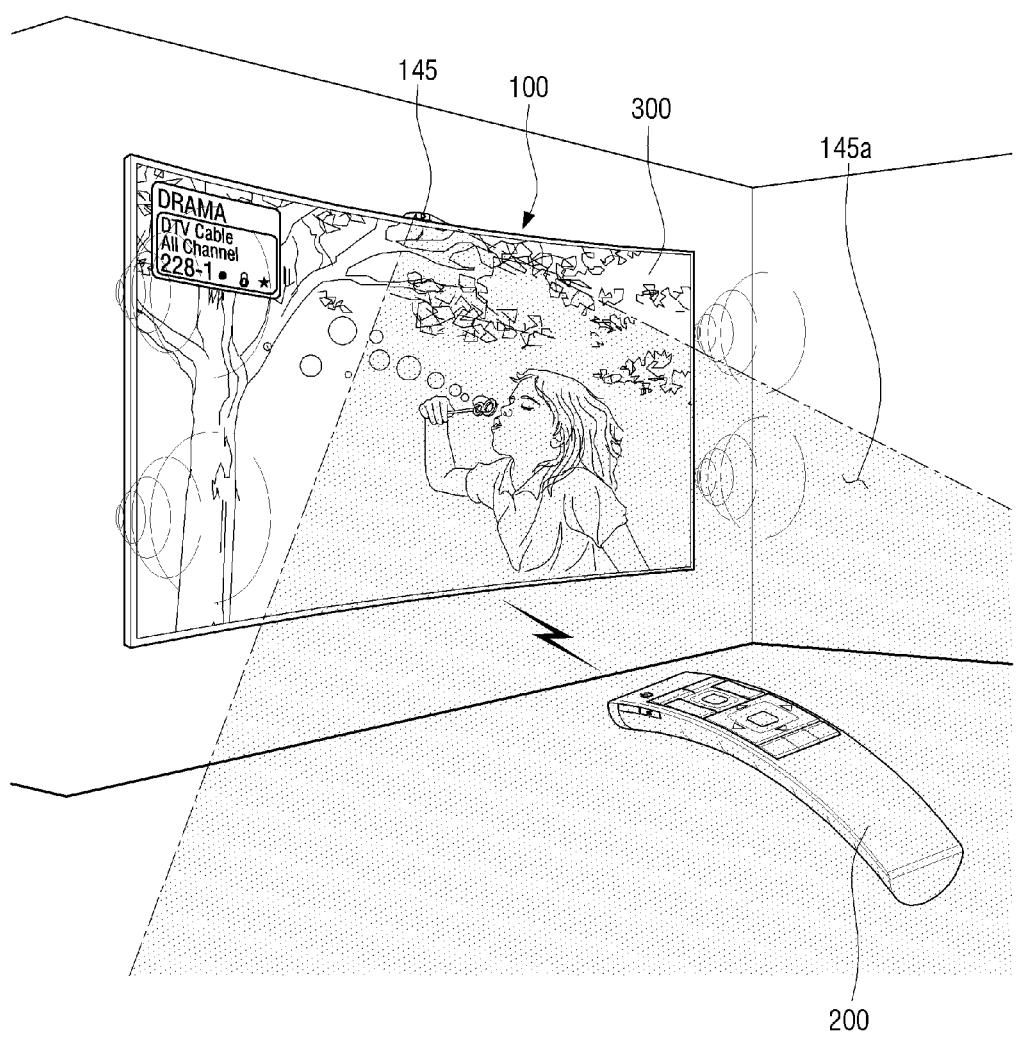
Figure 5F:
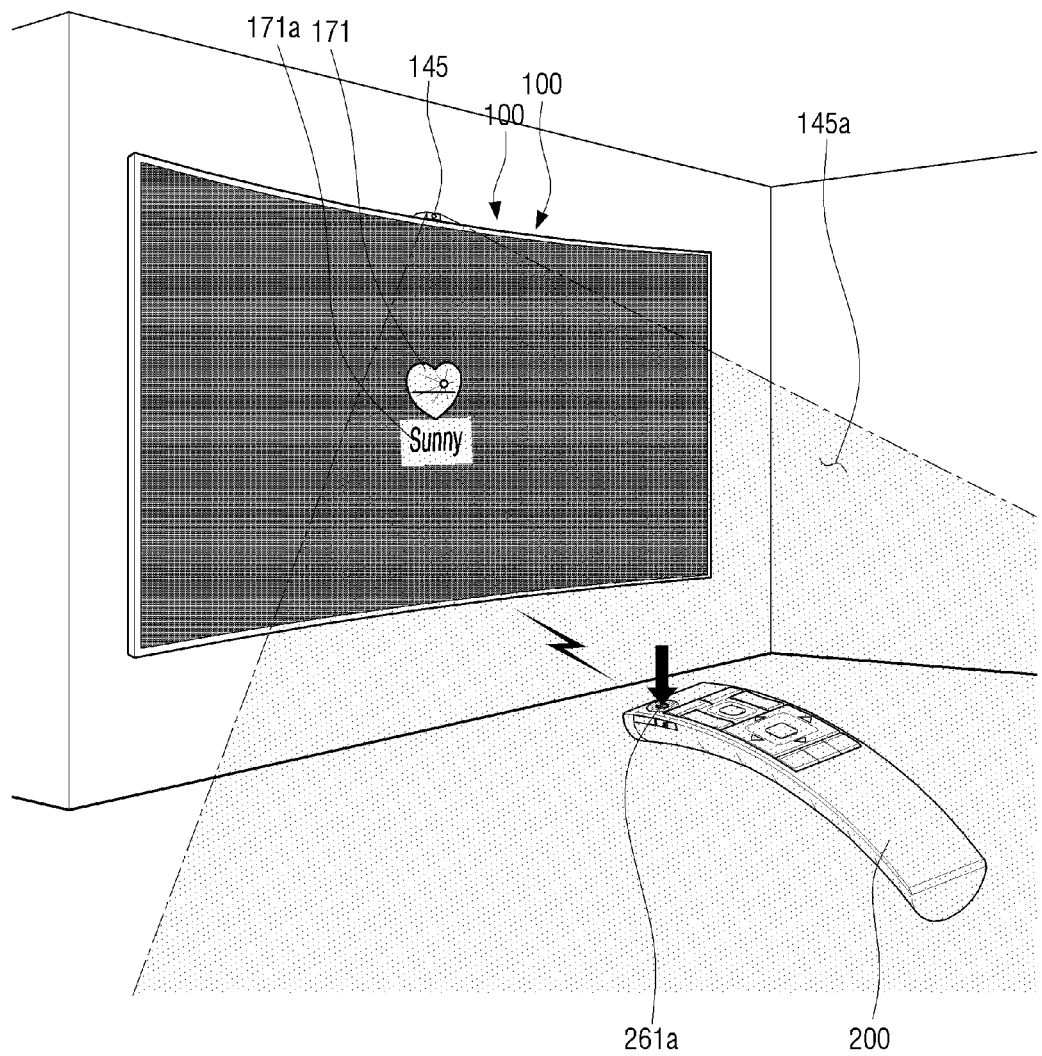
FIGS. 5F and 5G are drawings illustrating another example of a welcome screen.
Figure 5G:
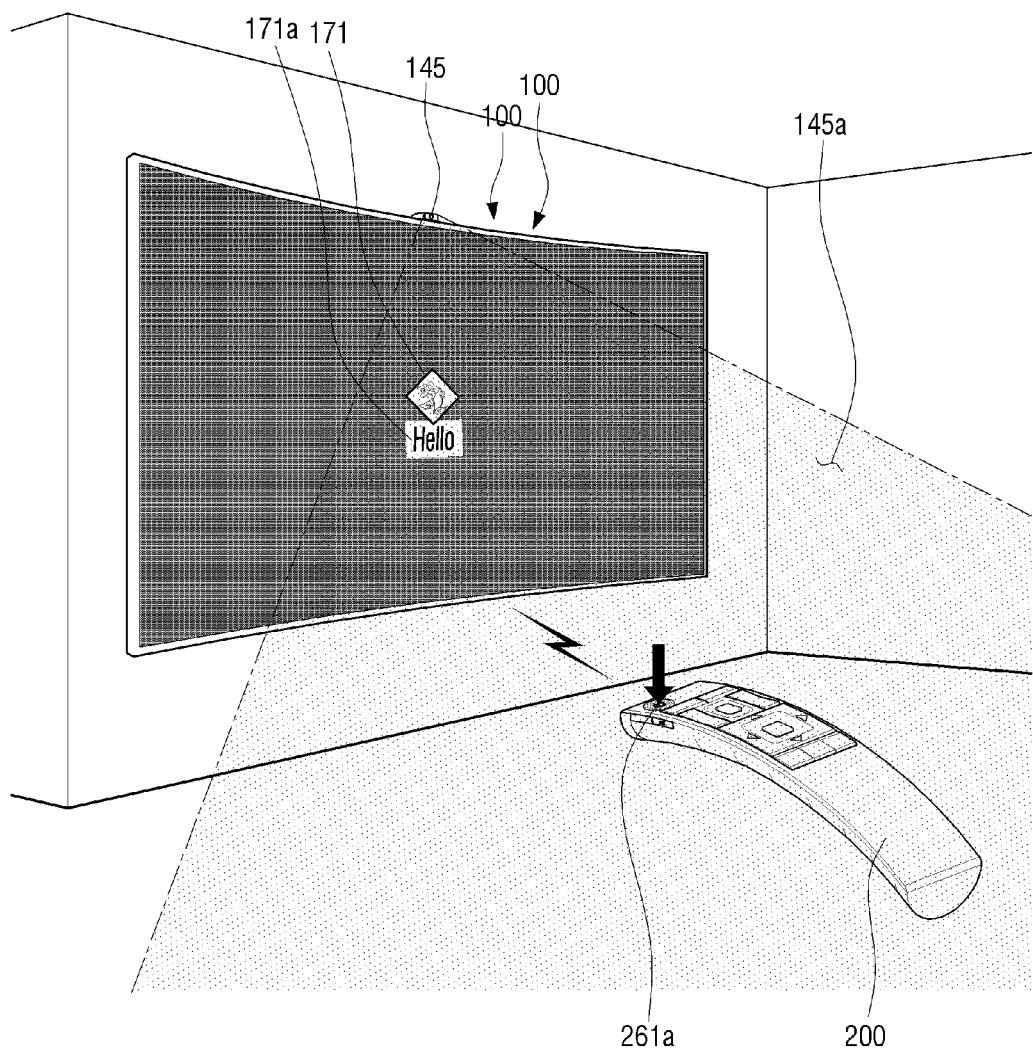

Referring to FIGS. 4 and 5E, the welcome screen 171 disappears from a screen of the display apparatus 100, and broadcast channel (for example, cable broadcast channel 228-1, 300) is displayed (operation 410).

On a screen of the display apparatus 100, the welcome screen 171 may disappear and contents can be displayed. In case of the contents displayed on a screen of the display apparatus 100, a video, an image, or a webpage through not only broadcasting but also applications installed on the display apparatus 100 can be included.

The controller 110 of the display apparatus 100 can change a state of the display apparatus 100 from a welcome mode to a normal mode in response to the received second control information.

In response to receipt of the second control information, the controller 110 of the display apparatus 100 may display a state of the display apparatus 100 on a broadcast screen 300 when a time interval of 0.05 seconds to 0.3 seconds has elapsed.

In response to receipt of the second control information, the controller 110 of the display apparatus 100, at a time which is less than 0.25 seconds, before the broadcast 300 is displayed on a screen of the display apparatus 100, may change a state of the display apparatus 100 from a welcome mode to a normal mode.

In a welcome mode, the display 170, by the control of the controller 110, is operated in part, but in a normal mode, the display 170 can be operated in whole by the control of the controller 110. In a welcome mode and a normal mode, a respective power consumption amount of the display apparatus 100 may vary based on the operational mode. In a welcome mode and a normal mode, power consumption may vary by partial or whole operation of the display 170.

In response to receipt of the second control information, the storage 180 may store the second control information by the control of the controller 110.

The controller 110, in response to contents display on a screen, may provide visual feedback, such as, for example, the animation effect.

The controller 110, in response to contents display, may provide auditory feedback.

At operation S370 of FIG. 3, when contents are displayed on a screen of the display apparatus 100, a method for controlling a screen of the display apparatus may end.

Figure 6A:
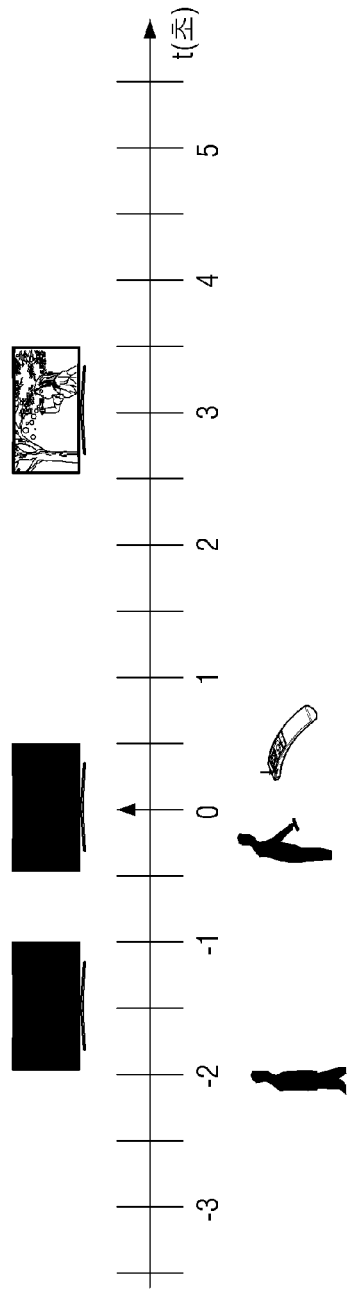
FIGS. 6A and 6B is a drawing illustrating an example of a method for controlling a screen of a display apparatus as a function of time, as in an exemplary embodiment.
Figure 6B:
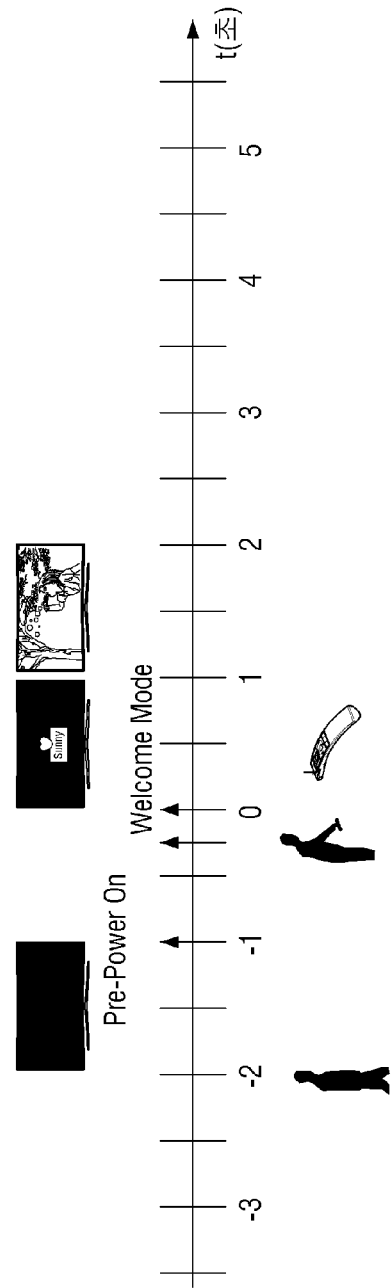

FIGS. 6A and 6B are drawings illustrating examples of a method for controlling a screen of a display apparatus as a function of time, in accordance with an exemplary embodiment.

Figure 7:
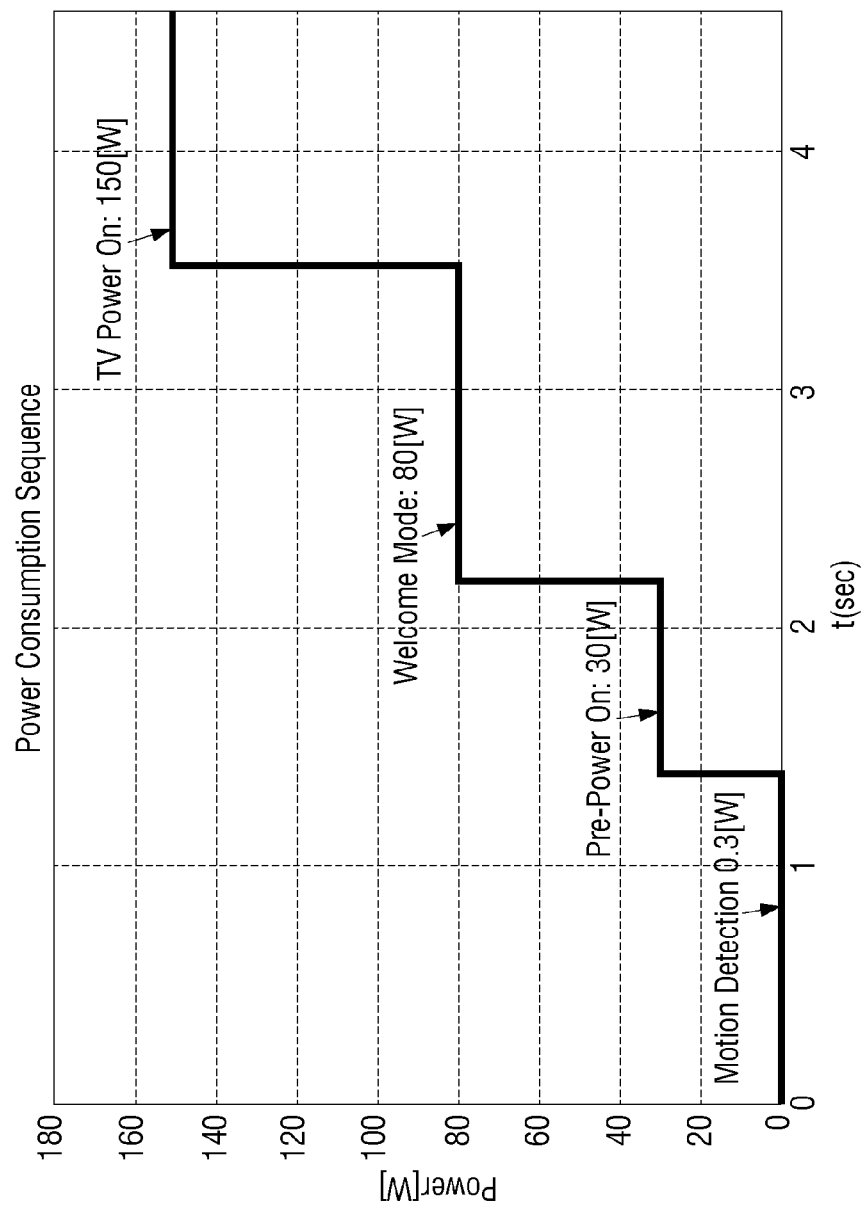
FIG. 7 is a drawing illustrating a power consumption sequence associated with a method for controlling a screen of a display apparatus, according to an exemplary embodiment.

FIG. 7 is a drawing illustrating a power consumption sequence associated with a method for controlling a screen of the display apparatus, according to an exemplary embodiment.

FIG. 6A illustrates a method for controlling a screen of a normal display apparatus, and FIG. 6B illustrates a method for controlling a screen of a display apparatus according to an exemplary embodiment.

In FIG. 6A, a user present in the camera recognition area 145a at time=−2 seconds may select the power button 261a of the remote controller 200 at time=0 seconds. The controller 210 of the remote controller 200 may transmit a control signal that corresponds to a selection of the power button 261a to the display apparatus 100. The display apparatus 100 which receives a control signal may display broadcasting after about 3 seconds, upon completion of a booting process.

In FIG. 6A and FIG. 7, when a user selects the power button 261a of the remote controller, power consumption of a normal display apparatus may increase from 0.3 W or less to about 150 W. In particular, the power consumption may steadily increase to 150 W without any intermediate levels.

In FIG. 6B, a user motion can be detected at the camera recognition area 145A at time=−2 seconds. The controller 110 of the display apparatus 100 can change a state of the display 100 from a screen off mode to a pre-power on mode. By the pre-power on mode change of the display apparatus 100, power consumption can be increased from 0.3 W or less to about 30 W.

In the display apparatus 100 which is in a pre-power on mode, during the setting time (such as, for example, 5 minutes, setting time changeable), when the first control signal is not received from the remote controller 200, a state of the display apparatus 100 can return to a screen off state. Power consumption of the display apparatus 100 can return to 0.3 W or less.

In the display apparatus 100 which is in a pre-power on mode, when the first control signal is received from the remote controller 200, the controller 110 of the display apparatus 100 can change a state of the display apparatus 100 from a pre-power on state to a welcome mode. By the change of the welcome mode of the display apparatus 100, power consumption can change from 30 W or less to about 80 W.

In the display apparatus 100 which is in a welcome mode, during the setting time (such as, for example, 5 minutes, setting time can change), when a second control signal is not received from the remote controller 200, a state of the display apparatus 100 may return to the pre-power on mode. In this circumstance, the power consumption of the display apparatus 100 may return from 80 W to 30 W.

In the display apparatus 100 which is in a welcome mode, when the second control signal is received from the remote controller 200, the controller 110 can change a state of the display apparatus 100 from a welcome mode to a normal mode. By changing to a normal mode of the display apparatus 100, the corresponding power consumption amount may increase from about 80 W to 150 W.

In FIGS. 6A, 6B and 7, power consumption in a case in which a broadcast signal is displayed on a screen of the display apparatus 100 may be similar. In addition, in case of power consumption during the booting time of FIGS. 6A and 6B, the power consumption associated with FIG. 6B may be less that the power consumption associated with FIG. 6A.

In FIG. 6A, when a user grips the remote controller 200 at time=0 seconds and selects the power button 261a, the time required until broadcast display on a screen of the display apparatus 100 may exceed 3 seconds (for example, 5 seconds or less can be spent according to display apparatuses).

In FIGS. 6A and 6B, when a user grips the remote controller 200 at time=0 seconds and selects the power button 261a, the time required until a broadcast signal is displayed on a screen of the display apparatus 100 may exceed 1.6 seconds (for example, 2 seconds or less may elapse according to display apparatuses).

In FIGS. 6A and 6B, when comparing a required amount of time for a broadcast signal to be displayed in the display apparatus 100, drawing (b) corresponds to a shorter broadcast time.

By at least one of the user motion detection, pre-power on mode and welcome mode of the display apparatus 100, an amount of time required for a broadcast signal to be displayed in the display apparatus 100 can be shortened. In addition, by at least one of the user motion detection, pre-power on mode and welcome mode of the display apparatus 100, power consumption of the display apparatus 100 can be reduced.

An application execution method of the portable terminal having the bent display of the exemplary embodiments may be realized as a program command which can be executed through various computer means, and be recorded in a transitory or non-transitory computer readable recording medium. In this case, the recording medium readable via the computer may include anyone or more of a program command, a data file, a data structure, or the like. Meanwhile, a program command which is recorded on a recordable medium is specially designed and configured for the exemplary embodiments, but may be apparent to a person of ordinary skill in the art of computer software.

The non-transitory computer readable medium includes any of a hard disc, a floppy disc, a magnetic media such as a magnetic tape, Compact Disc Read Only Memory (CD-ROM), optical media such as Digital Versatile Disc (DVD), magneto-optical media such as a floptical disc, Read Only Memory (ROM), Random Access Memory (RAM), and a flash memory which is specially configured hardware device for storing and executing program commands. In addition, the program commands include not only machine codes which are made by a compiler, but also high-level language code which can be executed via computer by using an interpreter. The aforementioned hardware device is configured to operate as one or more software modules for the operations of the exemplary embodiments, and the reverse is the same.

The foregoing exemplary embodiments and advantages are merely exemplary and are not to be construed as limiting the present inventive concept. The exemplary embodiments can be readily applied to other types of apparatuses. The description of the exemplary embodiments is intended to be illustrative, and not to limit the scope of the claims, and many alternatives, modifications, and variations will be apparent to those of ordinary skill in the art.

What is claimed is:

1. A display apparatus comprising:
a sensor configured to sense a user motion;
a display;
a power supplier;
a transceiver configured to receive control information from a remote control device; and
a controller configured to control the sensor, the display, the power supplier, and the transceiver,
wherein the controller is further configured to:
based on the user motion being sensed by the sensor, shift a state of the display apparatus from a power off mode to a pre-power on mode,
based on first control information, that corresponds to a motion of the remote control device while the display apparatus is in the pre-power on mode, being received from the remote control device, control the display to display a predetermined screen on a portion of the display, and
based on second control information received from the remote control device, control the display to display content on a whole of the display.

2. The display apparatus as claimed in claim 1, wherein in the pre-power on mode, the controller is further configured to control the power supplier to supply power to each component of the display apparatus except the display.

3. The display apparatus as claimed in claim 1, wherein the first control information is received via one of the transceiver and an optical receiver.

4. The display apparatus as claimed in claim 1, wherein based on receipt of the first control information, the controller is further configured to control the power supplier to supply power to the display of the display apparatus.

5. The display apparatus as claimed in claim 1, wherein the controller is further configured to control the display to display the predetermined screen on a part of an area of the display to which power is supplied.

6. The display apparatus as claimed in claim 5, wherein the controller is further configured to control the power supplier to provide power which is different from the power provided for displaying the predetermined screen to a rest of an area of the display.

7. The display apparatus as claimed in claim 1, further comprising an audio outputter configured to output audio, wherein based on receipt of the first control information, the controller is further configured to control the power supplier to supply power to the audio outputter, and to control to output auditory feedback to the audio outputter.

8. The display apparatus as claimed in claim 1, wherein the second control information is received via one of the transceiver and an optical receiver.

9. The display apparatus as claimed in claim 1, wherein the controller is further configured to control the power supplier to continuously provide power to the sensor when power is not being supplied to the display.

10. The display apparatus as claimed in claim 1, wherein the controller comprises a main processor and a sub processor, and the sensor is controlled by the sub processor.

11. A method for controlling a display apparatus, the method comprising:
based on sensing user motion, by a sensor configured to sense the user motion, shifting a state of the display apparatus from a power off mode to a pre-power on mode;
based on receiving first control information that corresponds to a motion of the remote control device from the remote control device, displaying a predetermined screen that corresponds to a motion of the remote control device on a portion of a display of the display apparatus while the display apparatus is in the pre-power on mode; and
based on receiving second control information from the remote control device, displaying content on a whole of the display apparatus.

12. The method of claim 11, further comprising:
when the display apparatus operates in a welcome mode, supplying a first amount of power to a display of the display apparatus; and
when the display apparatus operates in a normal operational mode, supplying a second amount of power to the display of the display apparatus, wherein the second amount of power is greater than the first amount of power.

13. The method of claim 12, wherein when the first amount of power is supplied to the display, a portion of the display receives the first amount of power such that a remaining portion of the display does not receive power.

14. The method of claim 13, wherein when the second amount of power is supplied to the display, an entirety of the display receives power.

15. The method of claim 11, wherein when the display apparatus operates in a welcome mode, the method further comprises displaying a stored image in the display apparatus and when the display apparatus operates in a normal operational mode, the method further comprises displaying at least one content received from an external source.

\* \* \* \* \*